United States Patent
Ichimasa et al.

(10) Patent No.: US 8,306,277 B2
(45) Date of Patent: Nov. 6, 2012

(54) IMAGE PROCESSING APPARATUS AND IMAGE PROCESSING METHOD, AND COMPUTER PROGRAM FOR CAUSING COMPUTER TO EXECUTE CONTROL METHOD OF IMAGE PROCESSING APPARATUS

(75) Inventors: Shoji Ichimasa, Chigasaki (JP); Masahiro Kawarada, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 918 days.

(21) Appl. No.: 11/460,125

(22) Filed: Jul. 26, 2006

(65) Prior Publication Data
US 2007/0024723 A1 Feb. 1, 2007

(30) Foreign Application Priority Data

Jul. 27, 2005 (JP) .................................. 2005-217393
Aug. 2, 2005 (JP) .................................. 2005-224596

(51) Int. Cl.
*G06K 9/00* (2006.01)
(52) U.S. Cl. ......... 382/115; 382/116; 382/118; 382/117
(58) Field of Classification Search ......................... None
See application file for complete search history.

(56) References Cited

U.S. PATENT DOCUMENTS

| 4,975,975 A * | 12/1990 | Filipski ......................... 382/227 |
| 5,659,626 A * | 8/1997 | Ort et al. ....................... 382/125 |
| 5,987,170 A * | 11/1999 | Yamamoto et al. ........... 382/170 |
| 6,021,211 A * | 2/2000 | Setlak et al. .................. 382/124 |
| 6,285,780 B1 * | 9/2001 | Yamakita et al. ............. 382/110 |
| 7,646,893 B2 * | 1/2010 | Yamada et al. ............... 382/115 |
| 2002/0012521 A1 * | 1/2002 | Nagasaka et al. .............. 386/46 |
| 2002/0048390 A1 * | 4/2002 | Ikegami ........................ 382/124 |
| 2003/0099001 A1 * | 5/2003 | Watanabe et al. ............. 358/462 |
| 2003/0161504 A1 * | 8/2003 | Inoue ............................ 382/115 |
| 2004/0022442 A1 * | 2/2004 | Kim .............................. 382/225 |

(Continued)

FOREIGN PATENT DOCUMENTS

JP 3-23903 1/1991

(Continued)

*Primary Examiner* — Chan S Park
*Assistant Examiner* — Avinash J Yentrapati
(74) *Attorney, Agent, or Firm* — Carter, DeLuca, Farrell & Schmidt, LLP

(57) ABSTRACT

Object recognition is executed by using, of feature data classified into a plurality of groups, only feature data belonging to a selected group. Hence, it is unnecessary to compare and refer to all feature data so that object recognition processing can be speeded up.

8 Claims, 16 Drawing Sheets

U.S. PATENT DOCUMENTS

| | | | |
|---|---|---|---|
| 2004/0052413 A1* | 3/2004 | Kunii et al. | 382/159 |
| 2004/0215454 A1* | 10/2004 | Kobayashi et al. | 704/231 |
| 2005/0008263 A1* | 1/2005 | Nagahashi et al. | 382/305 |
| 2005/0157908 A1* | 7/2005 | Matsugu et al. | 382/107 |
| 2005/0175243 A1* | 8/2005 | Luo et al. | 382/224 |
| 2005/0185835 A1* | 8/2005 | Matsugu et al. | 382/159 |
| 2005/0223236 A1* | 10/2005 | Yamada et al. | 713/186 |
| 2005/0248681 A1* | 11/2005 | Nozaki et al. | 348/345 |
| 2006/0018523 A1* | 1/2006 | Saitoh et al. | 382/124 |
| 2006/0251339 A1* | 11/2006 | Gokturk et al. | 382/305 |
| 2007/0024723 A1* | 2/2007 | Ichimasa et al. | 348/231.99 |
| 2007/0036400 A1* | 2/2007 | Watanabe et al. | 382/124 |
| 2007/0065003 A1* | 3/2007 | Kellerman et al. | 382/159 |
| 2008/0080748 A1* | 4/2008 | Sukegawa et al. | 382/118 |
| 2008/0082323 A1* | 4/2008 | Bai et al. | 704/214 |
| 2008/0263042 A1* | 10/2008 | Li et al. | 707/7 |
| 2009/0135269 A1* | 5/2009 | Nozaki et al. | 348/222.1 |
| 2009/0226053 A1* | 9/2009 | Matsuda et al. | 382/125 |

FOREIGN PATENT DOCUMENTS

| | | |
|---|---|---|
| JP | 3023903 | 1/2000 |
| JP | 2003-316938 | 11/2003 |
| JP | 2004-317699 | 11/2004 |

* cited by examiner

F I G. 12
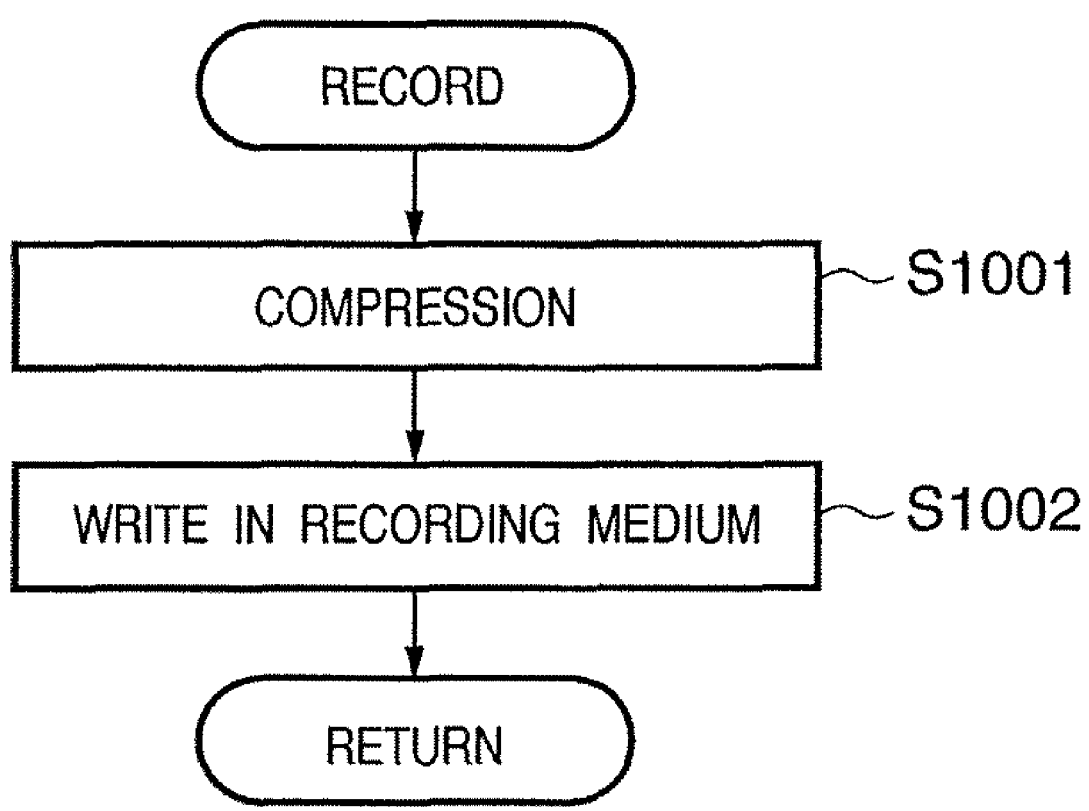

PERSON A   PERSON B   PERSON C

IMAGE PROCESSING APPARATUS AND IMAGE PROCESSING METHOD, AND COMPUTER PROGRAM FOR CAUSING COMPUTER TO EXECUTE CONTROL METHOD OF IMAGE PROCESSING APPARATUS

BACKGROUND OF THE INVENTION

1. Field of the Invention

The present invention relates to an object recognition technique of recognizing an individual by extracting feature data of an object.

2. Description of the Related Art

Japanese Patent No. 3023903 discloses a technique of recognizing an object on the basis of its features. In the object recognition technique of Japanese Patent No. 3023903, the positions of eyes, nose, and mouth are detected by using several feature points of the object. When the feature point extraction precision increases in such an object recognition technique, an individual can be identified on the basis of feature data such as eyes, nose, and mouth data.

When an individual can be identified, the object can be specified in sensing an image by, e.g., a camera, which enables to sense an image under better conditions.

However, a camera may be unable to hold many personal feature data such as eyes, nose, and mouth data because of the capacity of the storage medium in the camera. Additionally, since calculation processing to refer to many feature data in the camera is time-consuming when the calculation capability of the IC mounted in the camera is considered, the release time lag increases.

SUMMARY OF THE INVENTION

The present invention has been made in consideration of the above situation, and has as its object to speed up object recognition processing by executing object recognition using feature data about a predetermined object, which are selected from feature data classified in accordance with the object.

According to the present invention, the foregoing object is attained by providing an image processing apparatus comprising: a feature data registration unit adapted to divide object feature data into a plurality of groups and register the feature data; a selection unit adapted to select at least one of the plurality of groups; and an object recognition unit adapted to recognize an object by comparing first feature data belonging to the group selected by the selection unit with second feature data extracted from image data acquired by an image sensing unit.

According to the present invention, the foregoing object is also attained by providing an image sensing apparatus comprising: an image sensing unit adapted to acquire image data from an optical image of an object; a feature extraction unit adapted to extract feature data from the image data; and a record control unit adapted to control to classify and record one of a duplicate of the image data and record destination address information of the image data for each feature data extracted by the feature extraction unit.

Further, the foregoing object is also attained by providing an image processing method of an image processing apparatus, comprising steps of: dividing object feature data into a plurality of groups and registering the feature data; selecting at least one of the plurality of groups; recognizing an object by comparing first feature data belonging to the selected group with second feature data extracted from image data acquired by image sensing.

Furthermore, the foregoing object is also attained by providing an image sensing processing method of an image sensing apparatus, comprising: acquiring image data from an optical image of an object; extracting feature data from the image data; and controlling to classify and record one of a duplicate of the image data and record destination address information of the image data for each extracted feature.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a detailed flowchart of image record processing;

DESCRIPTION OF THE EMBODIMENTS

Preferred embodiments of the present invention will be described in detail in accordance with the accompanying drawings.

The embodiments to be described below are merely examples of means for practicing the present invention, and changes and modifications can be made appropriately depending on the arrangement of the apparatus to which the present invention is applied and various kinds of conditions. The present invention is not limited to the following embodiments.

Figure 1:
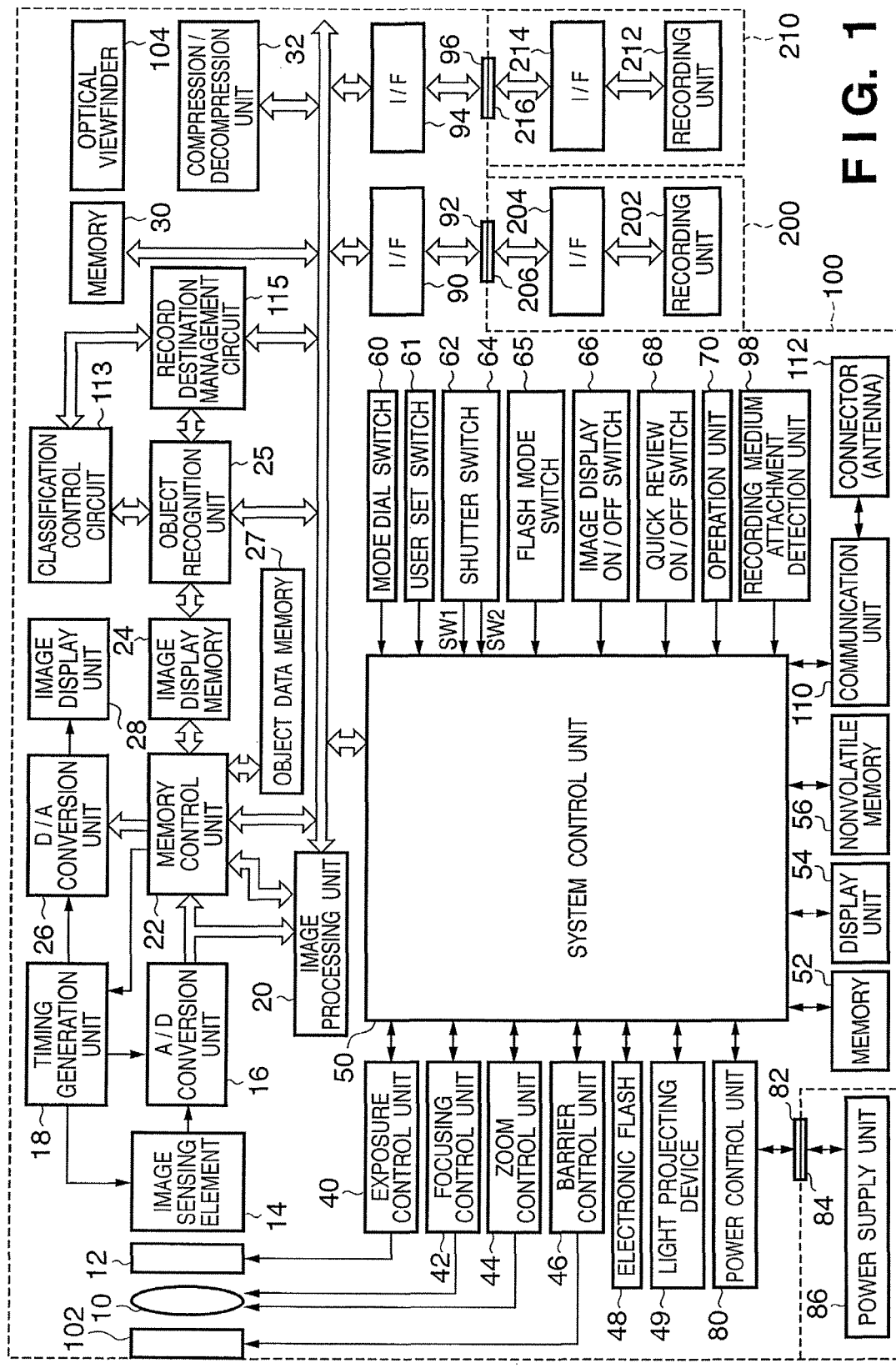
FIG. 1 is a block diagram showing a configuration of an image processing apparatus for executing object recognition processing according to an embodiment of the present invention.

FIG. 1 is a block diagram showing a configuration of an image processing apparatus for executing object recognition processing according to an embodiment of the present invention.

Referring to FIG. 1, reference numeral 100 denotes an image processing apparatus represented by a digital camera. A digital camera will be exemplified here.

Reference numeral 10 denotes an image sensing lens; 12, a shutter having a stop function; 14, an image sensing element to convert an optical image into an electrical signal; and 16, an A/D conversion unit to convert the analog signal output from the image sensing element 14 into a digital signal.

A timing generation unit 18 supplies a clock signal and a control signal to the image sensing element 14, A/D conversion unit 16, and a D/A conversion unit 26. The timing generation unit 18 is controlled by a memory control unit 22 and a system control unit 50.

An image processing unit 20 executes predetermined pixel interpolation and color conversion for data from the A/D conversion unit 16 and memory control unit 22.

The image processing unit 20 also executes predetermined calculation processing by using sensed image data. The system control unit 50 controls an exposure control unit 40 and a focusing control unit 42 on the basis of the calculation result obtained from image processing unit 20 to execute AF (Automatic Focus) processing, AE (Automatic Exposure) processing, and EF (Electronic Flash) processing of TTL (Through The Lens) scheme.

The image processing unit 20 also executes predetermined calculation processing by using sensed image data and executes AWB (Automatic White Balance) processing by TTL on the basis of the obtained calculation result.

The memory control unit 22 controls the A/D conversion unit 16, the timing generation unit 18, the image processing unit 20, an image display memory 24, the D/A conversion unit 26, a memory 30, and a compression/decompression unit 32.

Data output from the A/D conversion unit 16 is written in the image display memory 24 or memory 30 through the image processing unit 20 and memory control unit 22 or directly through the memory control unit 22.

Reference numeral 24 denotes the image display memory; 26, the D/A conversion unit, and 28, an image display unit comprising a TFT LCD. Display image data written in the image display memory 24 is displayed on the image display unit 28 through the D/A conversion unit 26.

When sensed image data are sequentially displayed by using the image display unit 28, an electronic viewfinder (EVF) function can be implemented.

Display of the image display unit 28 can arbitrarily be set ON/OFF in accordance with an instruction from the system control unit 50. When display is OFF, the power consumption of the image processing apparatus 100 can greatly be reduced.

The memory 30 is used to store obtained still images and moving images and has a memory capacity enough to store a predetermined number of still images and a moving image for a predetermined time.

Hence, even in the sequential image sensing mode or panoramic image sensing mode to continuously take a plurality of still images, or when a still image is recorded at an arbitrary timing during moving image sensing, a large amount of images can be written in the memory 30 at a high speed.

The memory 30 can also be used as the work area of the system control unit 50.

A classification control circuit 113 manages information of at least one feature to be extracted from image data and information of a record destination corresponding to each feature and transmits the information of the features to be extracted to an object recognition unit 25 (to be described later). Features can include face features to specify a person, e.g., eyes, nose, mouth, chin, ear, and mole, and face expression features such as a mouth open state, tilt of angle of mouth, open/closed eyes, and shape of the tail of eyes. In addition, features of patterns such as a road sign, flag, and badge and features of scenes such as a mountain, window, and vehicle can be used. That is, as information of features, indices such as a shape, position in an image, and color are managed. When the object recognition unit 25 (to be described later) has found a new feature different from managed features, it is newly managed as a new feature.

The object recognition unit 25 acquires image data from the memory 30, extracts a feature contained in the image data on the basis of object feature data stored in an object data memory 27, and specifies, on the basis of the difference between extracted personal features, the object (individual) to be sensed. In the present invention, the feature extraction method is not particularly limited, and a prior art may be used. For example, a known feature extraction method described in Japanese Patent Laid-Open No. 2003-316938 or 2004-317699 can be used. First, an edge is detected by using luminance information of image data. Then a desired feature is extracted on the basis of indices such as the shape of the detected edge, its position in the image, and the color of the edge. The features to be extracted are received from the classification control circuit 113 as needed. When the desired features are detected from the image data, the image data and the information of the extracted features are output to a record destination management circuit 115 (to be described later). If a new feature that has not been transmitted from the classification control circuit 113 is found, the information of the feature is transmitted to the classification control circuit 113.

The record destination management circuit 115 requests the system control unit 50 to duplicate the image data in accordance with the types of features extracted by the object recognition unit 25 and designates the record destination of the duplicated image data. When desired features are extracted from the image data, the record destination management circuit 115 acquires the information of the types of extracted features from the object recognition unit 25. In addition, on the basis of the information of the types of obtained features, the record destination management circuit 115 acquires, from the classification control circuit 113, the directory information of a record destination corresponding to the types of features and requests the system control unit 50 to record the duplicated image data at the desired record destination. The record destination management circuit 115 also checks whether a directory serving as a record destination is generated in recording units 202 and 212 (to be described later). If no directory is generated, the record destination management circuit 115 requests the system control unit 50 to generate a new directory in the recording units 202 and 212.

When the above-described classification control circuit 113, object recognition unit 25, and record destination management circuit 115 are provided, it can automatically be determined whether sensed image data contains a desired person, face expression, pattern, or scene.

A compression/decompression unit 32 compresses/decompresses image data by adaptive discrete cosine transform (ADCT). The compression/decompression unit 32 reads out an image stored in the memory 30, compresses or decompresses the image data by, e.g., JPEG or MPEG, and writes the processed data in the memory 30.

The exposure control unit 40 controls the shutter 12 having a stop function. The exposure control unit 40 also has an electronic flash brightness control function in cooperation with an electronic flash 48.

The focusing control unit 42 controls focusing of the image sensing lens 10. A zoom control unit 44 controls zooming of the image sensing lens 10. A barrier control unit 46 controls the operation of a protection unit 102 serving as a barrier.

The electronic flash 48 has an AF auxiliary light projecting function and an electronic flash control function.

The exposure control unit 40 and focusing control unit 42 are controlled by TTL. On the basis of a calculation result obtained by causing the image processing unit 20 to process sensed image data, the system control unit 50 controls the exposure control unit 40 and focusing control unit 42.

A light projecting device 49 including an LED or lamp turns on the LED or lamp to project light if the object brightness is lower than a predetermined brightness. The light projecting device 49 is arranged closer to the image sensing lens 10 than the electronic flash 48 or at equidistance. The light projecting device 49 is configured to contract pupils by light projection to the object, thereby achieving red-eye reduction and preventing any red-eye effect in an image.

The system control unit 50 controls the entire image processing apparatus 100. A memory 52 stores constants, variables, and programs for the operation of the system control unit 50.

A display unit 54 includes a liquid crystal display device and loudspeaker to indicate an operation state and message by using a text, image, and sound in accordance with program execution by the system control unit 50. The display unit 54 is arranged at a single or a plurality of visible positions near the operation unit of the image processing apparatus 100 and configured with, e.g., LCDs, LEDs, and sound generation elements.

Some functions of the display unit 54 are arranged in an optical viewfinder 104.

Examples of display contents on the LCD of the display unit 54 are the single image sensing/sequential image sensing mode, self timer, compression ratio, number of recording pixels, number of recorded images, and number of recordable images. In addition, shutter speed, F-number, exposure compensation, flash, red-eye reduction, macro image sensing, buzzer setting, clock battery level, battery level, error, and information by a plurality of digits are displayed. The attached state of recording media 200 and 210, communication I/F operation, and date/time are also displayed.

Of the display contents of the display unit 54, those displayed in the viewfinder 104 are in in-focus state, camera shake warning, flash illumination, shutter speed, F-number, and exposure compensation.

A nonvolatile memory 56 is an electrically erasable/recordable memory such as an EEPROM.

Reference numerals 60, 62, 64, 65, 66, 68, and 70 denote operation means for inputting various kinds of operation instructions of the system control unit 50. They include switches, dials, touch panel, pointing by line-of-sight detection, voice recognition device or a combination thereof.

The operation means will be described here in detail.

The mode dial switch 60 can selectively set functional modes such as power off, automatic image sensing mode, image sensing mode, panoramic image sensing mode, playback mode, multiwindow playback/erase mode, and PC connection mode.

A user set switch 61 can set various detection conditions of image sensing for difference users.

The shutter switch SW1 62 is turned on when a shutter release button is operated halfway (not shown) to instruct the start of an operation such as AF (Automatic Focus) processing, AE (Automatic Exposure) processing, AWB (Automatic White Balance) processing, or EF (Electronic Flash) processing.

The shutter switch SW2 64 is turned on in response to the full stroke of the shutter release button (not shown) to instruct the start of exposure processing of writing image data read from the image sensing element 14 in the memory 30 through the A/D conversion unit 16 and memory control unit 22. The shutter switch SW2 64 also instructs the start of development processing using calculation by the image processing unit 20 and memory control unit 22. The shutter switch SW2 64 also instructs the start of record processing of reading out image data from the memory 30, compressing the image data by the compression/decompression unit 32, and writing it in the recording medium 200 or 210.

The flash mode switch 65 sets an electronic flash emission mode such as a forced emission mode, auto-mode emission, red-eye reduction auto-mode emission, or emission OFF.

The image display ON/OFF switch 66 can set ON/OFF of the image display unit 28. With this function, power can be saved by stopping power supply to the image display unit 28 including a TFT LCD in image sensing using the optical viewfinder 104.

The quick review ON/OFF switch 68 can set a quick review function of automatically playing back sensed image data immediately after image sensing. In this embodiment, the quick review ON/OFF switch 68 particularly has a function of setting the quick review function when the image display unit 28 is set to OFF.

The operation unit 70 has various kinds of buttons and a touch panel, and includes a menu button, set button, macro button, multiwindow playback page forward/backward button, and single image sensing/sequential image sensing/self timer switching button. It also includes a menu move+(plus) button, menu move−(minus) button, playback image move+ (plus) button, playback image move−(minus) button, image quality select button, exposure compensation button, and date/time setting button.

A power control unit 80 includes a power supply detection circuit, DC/DC converter, and switch circuit to switch a block to be energized. The power control unit 80 detects the presence/absence of a battery, battery type, and battery level, controls the DC/DC converter on the basis of the detection result and an instruction from the system control unit 50, and supplies a necessary voltage to the units including the recording medium for a necessary period.

Reference numeral 82 denotes a connector; 84, a connector; and 86, a power supply unit formed from a primary battery such as an alkaline battery or lithium battery, a secondary battery such as an NiCd battery, NiMH battery, or Li battery, or an AC adapter.

Reference numerals 90 and 94 denote interfaces to a recording medium such as a memory card or hard disk; and 92 and 96, connectors to connect a recording medium such as a memory card or hard disk. A recording medium attachment detection unit 98 detects whether the recording medium 200 or 210 is attached to the connector 92 or 96.

In this embodiment, there are two systems of interfaces and connectors to attach recording media. The interfaces and connectors to attach recording media can have either one or a plurality of systems. Interfaces and connectors of different standards may be combined.

Interfaces and connectors based on a standard such as a PCMCIA card or CF (CompactFlash®) card can be used as the interfaces 90 and 94 and the connectors 92 and 96. In this case, various kinds of communication cards such as a LAN card, modem card, USB card, IEEE1404 card, P1284 card, SCSI card, and communication card for PHS, for instance, are connected to the interfaces 90 and 94 and the connectors 92 and 96. Hence, image data and management information associated with image data can be transferred to/from another computer or a peripheral device such as a printer (record destination).

The recording medium used for normally recording image data may be different from the recording medium used for recording image data in accordance with their features as needed. In this case, even when a recording medium has a strictly defined directory structure, and no new directory can be formed in it, duplicated image data can be classified in accordance with an object contained in an image by forming a new directory in another recording medium.

The protection unit 102 serving as a barrier prevents the image sensing unit including the image sensing lens 10 of the image processing apparatus 100 from being soiled or damaged by covering the image sensing unit.

Reference numeral 104 denotes the optical view finder, and image sensing can be done by using only the optical viewfinder 104 without using the electronic viewfinder function of the image display unit 28. The optical viewfinder 104 incorporates some functions of the display unit 54 to display, e.g., in-focus, camera shake warning, electronic flash charge, shutter speed, F-number, and exposure compensation.

A communication unit 110 has various kinds of communication functions such as RS232C, USB, IEEE1404, P1284, SCSI, modem, LAN, and wireless communication.

Reference numeral 112 denotes a connector to connect the image processing apparatus 100 to another device through the communication unit 110 or an antenna for wireless communication.

The recording medium 200 includes a memory card or hard disk.

The recording medium 200 comprises the recording unit 202 formed from, e.g., a semiconductor memory or magnetic disk, an interface 204 to the image processing apparatus 100, and a connector 206 to be connected to the image processing apparatus 100.

The recording medium 210 includes a memory card or hard disk.

The recording medium 210 comprises the recording unit 212 formed from, e.g., a semiconductor memory or magnetic disk, an interface 214 to the image processing apparatus 100, and a connector 216 to be connected to the image processing apparatus 100.

The image sensing operation of the image processing apparatus 100 according to this embodiment will be described next with reference to FIGS. 2 to 9.

Figure 2:
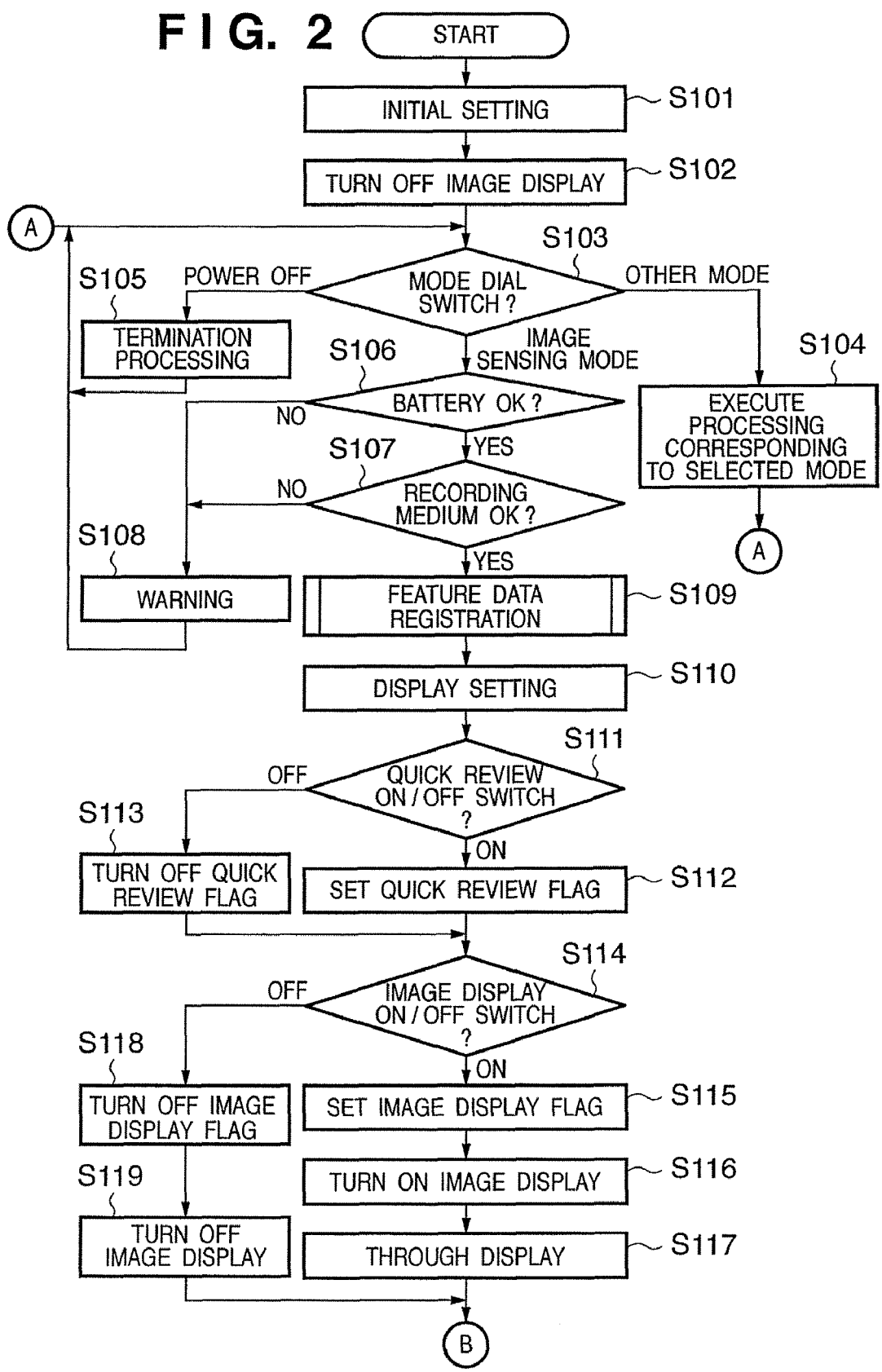
FIG. 2 is a flowchart showing an image sensing operation of the image processing apparatus.
Figure 3:
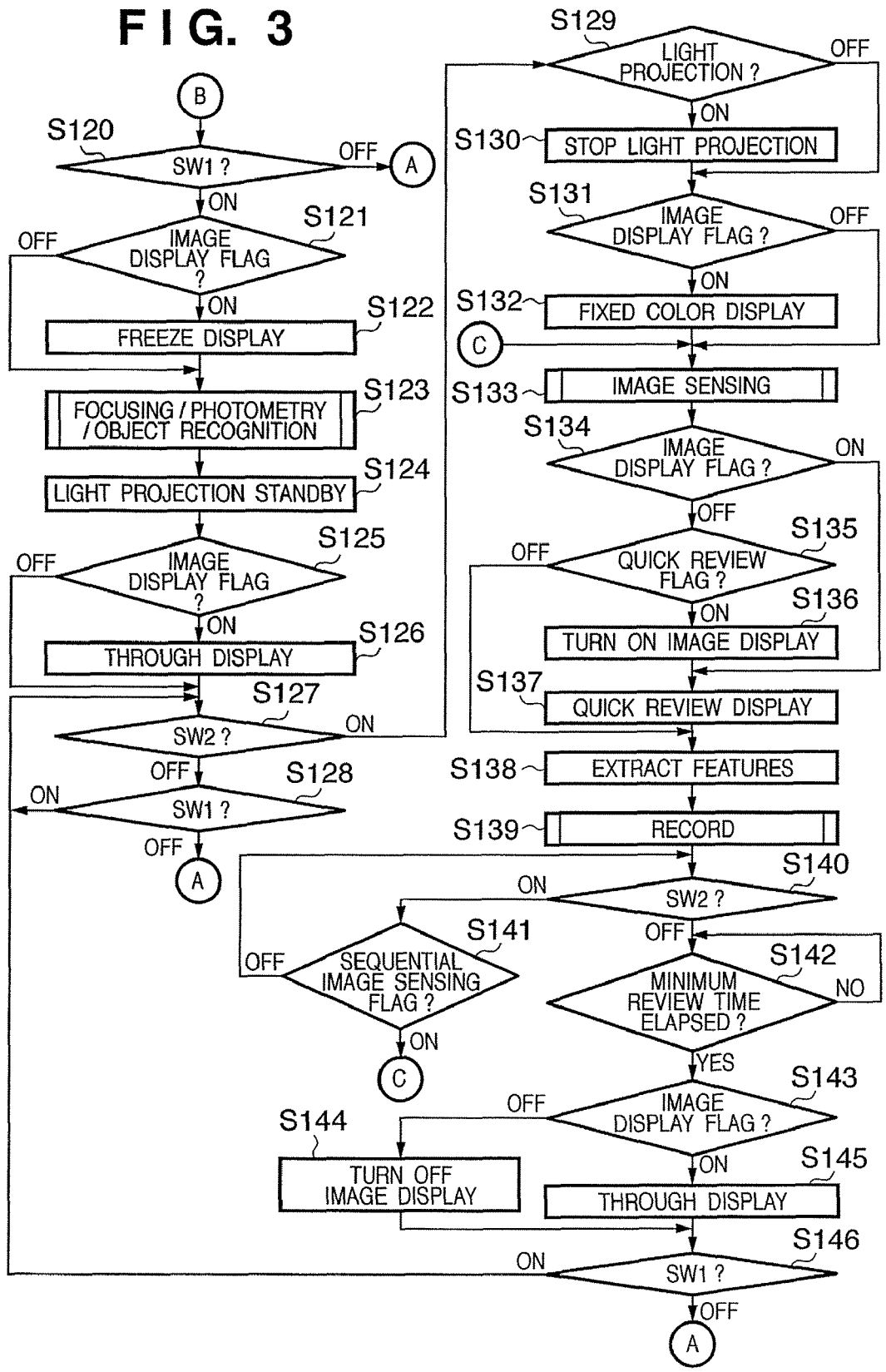
FIG. 3 is a flowchart showing the image sensing operation of the image processing apparatus.

FIGS. 2 and 3 are flowcharts showing the image sensing operation of the image processing apparatus 100.

Referring to FIGS. 2 and 3, upon powering on by, e.g., battery exchange, the system control unit 50 initializes flags and control variables (S101) and initializes image display on the image display unit 28 to the OFF state (S102).

The system control unit 50 determines the set position of the mode dial switch 60. If the mode dial switch 60 is set to power OFF (S103), predetermined termination processing is executed (S105). In the termination processing, display of each of the display units 28 and 54 is changed to an end state. In addition, the barrier of the protection unit 102 is closed to protect the image sensing unit. Necessary parameters including flags and control variables, set values, and set modes are recorded in the nonvolatile memory 56. The power control unit 80 stops unnecessary power supply to the units of the image processing apparatus 100 including the image display unit 28.

If the mode dial switch 60 is set to the image sensing mode (S103), the flow advances to step S106.

If the mode dial switch 60 is set to another mode such as an image playback mode (S103), the system control unit 50 executes processing corresponding to the selected mode (S104). Then, the flow returns to step S103.

The system control unit 50 causes the power control unit 80 to determine whether the remaining level and operation state of the power supply unit 86 such as a battery pose any problem for the operation of the image processing apparatus 100 (S106). If a problem exists, the display unit 54 outputs a predetermined warning message by an image or sound (S108). Then, the flow returns to step S103.

If the power supply unit 86 has no problem (S106), the system control unit 50 determines whether the operation state of the recording medium 200 or 210 has any problem for the operation of the image processing apparatus 100 and, more particularly, the record/playback operation of image data with respect to the recording medium (S107). If a problem exists, the display unit 54 outputs a predetermined warning message by an image or sound (S108). Then, the flow returns to step S103.

If the operation state of the recording medium 200 or 210 has no problem (S107), feature data for object recognition is registered (S109). Details of feature data registration processing in step S109 will be described later with reference to FIG. 4.

The display unit 54 indicates various set states of the image processing apparatus 100 by an image or sound (S110). If image display of the image display unit 28 is ON, the image display unit 28 also indicates various set states of the image processing apparatus 100 by an image or sound.

The system control unit 50 checks the set state of the quick review ON/OFF switch 68 (S111). If quick review is ON, a quick review flag is set (S112). If quick review is OFF, the quick review flag is reset (S113).

The state of the quick review flag is stored in the memory 52 or the internal memory of the system control unit 50.

The system control unit 50 checks the set state of the image display ON/OFF switch 66 (S114). If image display is ON, an image display flag is set (S115), and image display of the image display unit 28 is set to the ON state (S116). In addition, a through display state to sequentially display sensed image data is set (S117), and the flow advances to step S120 in FIG. 3.

In the through display state, data is sequentially written in the image display memory 24 through the image sensing element 14, A/D conversion unit 16, image processing unit 20, and memory control unit 22. When this data is sequentially displayed on the image display unit 28 through the memory control unit 22 and D/A conversion unit 26, an electronic viewfinder function is implemented.

If the image display ON/OFF switch 66 is set to OFF (S114), the image display flag is reset (S118). In addition, image display of the image display unit 28 is set to the OFF state (S119), and the flow advances to step S120.

When image display is OFF, image sensing is executed by using the optical viewfinder 104 without using the electronic viewfinder function of the image display unit 28. In this case, the power consumption of the image display unit 28 and D/A conversion unit 26 which consume large power can be reduced.

The state of the image display flag is stored in the memory 52 or the internal memory of the system control unit 50.

Referring to FIG. 3, if the shutter switch SW1 is not pressed (S120), the flow returns to step S103.

If the shutter switch SW1 is pressed (S120), the system control unit 50 determines the state of the image display flag stored in its internal memory or the memory 52 (S121). If the image display flag is set, the image display unit 28 is set to a freeze display state (S122), and the flow advances to step S123.

In the freeze display state, rewrite of image data in the image display memory 24 through the image sensing element 14, A/D conversion unit 16, image processing unit 20, and memory control unit 22 is inhibited. Finally written image data is displayed on the image display unit 28 through the memory control unit 22 and D/A conversion unit 26, thereby displaying a frozen image on the optical viewfinder 104.

If the image display flag is reset (S121), the flow advances to step S123.

The system control unit 50 focuses the image sensing lens 10 on the object by performing focusing control processing, decides the F-number and shutter speed by performing photometry processing, and executes object recognition processing (S123). In the photometry processing, the electronic flash 48 is also set as needed.

Details of focusing/photometry/object recognition processing in step S123 will be described later with reference to FIGS. 7 and 8.

In step S124, the light projecting device 49 is set to a light projection start state to mitigate red eyes. The system control unit 50 determines the state of the image display flag stored in its internal memory or the memory 52 (S125). If the image display flag is set, the image display unit 28 is set to the through display state (S126), and the flow advances to step S127. The through display state in step S126 is the same as that in step S117.

If the shutter switch SW2 is not pressed (S127), and the shutter switch SW1 is turned off (S128), the flow returns to step S103.

If the shutter switch SW2 is pressed (S127), it is determined on the basis of, e.g., the image sensing conditions whether light projection by the light projecting device 49 is being done (S129). If light projection is being done (S130), it is stopped (S130), and the flow advances to step S131. If light projection is not being done, the flow jumps to step S131 without executing step S130.

The system control unit 50 determines the state of the image display flag stored in its internal memory or the memory 52 (S131). If the image display flag is set, the image display unit 28 is set to a fixed color display state (S132), and the flow advances to step S133.

In the fixed color display state, sensed image data written in the image display memory 24 through the image sensing element 14, A/D conversion unit 16, image processing unit 20, and memory control unit 22 is replaced with image data of fixed color. An image of fixed color is displayed on the electronic viewfinder by displaying the image data of fixed color on the image display unit 28 through the memory control unit 22 and D/A conversion unit 26.

If the image display flag is reset (S131), the flow advances to step S133.

The system control unit 50 executes exposure processing of writing the sensed image data in the memory 30 through the image sensing element 14, A/D conversion unit 16, image processing unit 20, and memory control unit 22 or directly from the A/D conversion unit 16 through the memory control unit 22. The system control unit 50 also executes image sensing processing including development processing of reading out the image data written in the memory 30 through the memory control unit 22 and, as needed, the image processing unit 20 and executing various kinds of processing (S133).

Details of image sensing processing in step S133 will be described later with reference to FIG. 9.

The system control unit 50 determines the state of the image display flag stored in its internal memory or the memory 52 (S134). If the image display flag is set, quick review display is executed (S137). In this case, the image display unit 28 functions as an electronic viewfinder and always executes display even during image sensing. Quick review display immediately after image sensing is also done.

If the image display flag is reset (S134), the state of the quick review flag stored in the memory 52 or the internal memory of the system control unit 50 is determined (S135). If the quick review flag is set, image display of the image display unit 28 is set to the ON state (S136) to do quick review display (S137).

According to the above-described embodiment, for power saving or when image sensing is executed by using the optical viewfinder 104, the electronic viewfinder function is unnecessary. For this reason, even when image display of the image display unit 28 is OFF, a sensed image can automatically be played back on the image display unit 28 immediately after image sensing by setting the quick review function in the ON state so that a function convenient for power saving and sensed image check can be provided.

If the image display flag is not set (S134), and the quick review flag is not set (S135), the flow advances to step S138 with the image display unit 28 being kept in the OFF state. In this case, the image display unit 28 remains OFF even after image sensing, and quick review is not executed. In this utilization mode, priority is given to power saving without using the electronic viewfinder function of the image display unit 28 because a just-sensed image need not be checked like when continuously sensing images by using the optical viewfinder 104.

The object recognition unit 25 reads out image data stored in the memory 30 and also reads out, from the classification control circuit 113, information of features to be extracted. Features are extracted from the readout image data (step S138). For this feature extraction processing, parameters used in various kinds of components associated with image sensing may be used, including the storage control parameter of the image sensing element 14, the photometry parameter of the exposure control unit 40, the focusing parameter of the focusing control unit 42, and the focal length information of the zoom control unit 44. With these pieces of information, a shape, position in the image, and color can be specified more accurately.

Figure 10:
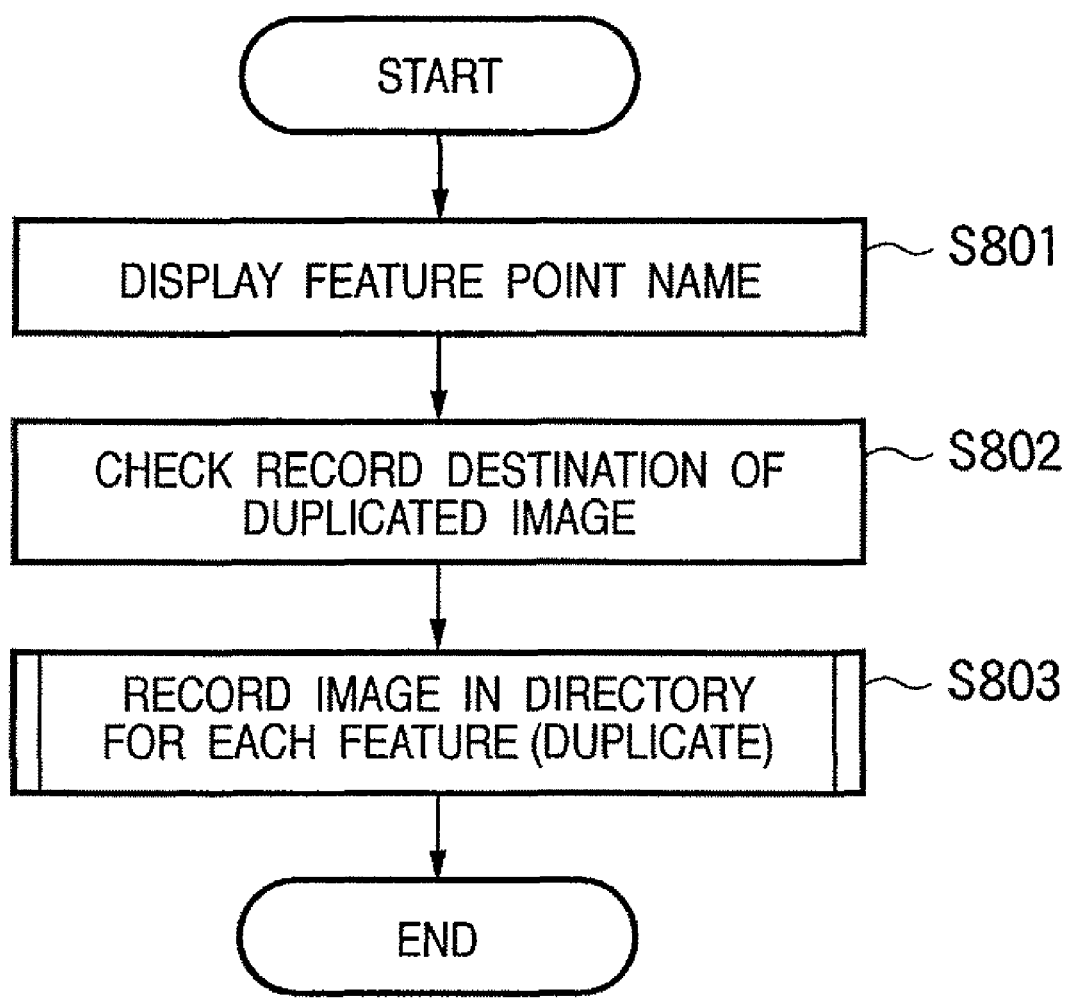
FIG. 10 is a flowchart showing feature extraction processing.

FIG. 10 shows the flow of feature extraction processing in step S138.

In step S801, feature data is obtained on the basis of the result of object recognition in step S211, and the information of the types of obtained features is output to the record destination management circuit 115. In addition, the types of extracted features are displayed on the image display memory 24 through the system control unit 50.

The record destination management circuit 115 reads out the directory information of record destination corresponding to the features managed by the classification control circuit 113 (step S802). On the basis of the readout directory information of record destination, duplicated image data is recorded at the record destination corresponding to the features through the system control unit 50 (step S803).

Details of duplicated image record processing in step S803 will be described later with reference to FIG. 11.

When the duplicated image record processing is ended, the flow advances to step S139.

The system control unit 50 reads out sensed image data written in the memory 30 and executes various kinds of image processing through the memory control unit 22 and, as needed, the image processing unit 20. In addition, after the compression/decompression unit 32 executes image compression processing corresponding to the set mode, record processing of writing image data in the recording medium 200 or 210 is executed (S139).

Details of record processing in step S139 will be described later with reference to FIGS. 13A to 13E.

If the shutter switch SW2 is held in the pressed state at the end of record processing in step S139 (S140), the system control unit 50 determines the state of a sequential image sensing flag stored in its internal memory or the memory 52 (S141). If the sequential image sensing flag is set, the flow returns to step S133 to continuously sense images. Next image sensing is executed.

If the sequential image sensing flag is not set (S141), the processing in steps S140 and S141 is repeated until the shutter switch SW2 is turned off (S140).

If the shutter switch SW2 is in the OFF state at the end of record processing in step S139, the flow advances to step S143 after the lapse of a predetermined minimum review time (S142). If quick review display is continued by keeping the shutter switch SW2 pressed, and the shutter switch SW2 is turned off after checking sensed image data (S140), the flow advances to step S143 after the lapse of a predetermined minimum review time (S142).

If the image display flag is set (S143), the system control unit 50 sets the image display unit 28 to the through display state (S145), and the flow advances to step S146. In this case, after sensed image data is checked by quick review display on the image display unit 28, the through display state to sequentially display sensed image data can be set for next image sensing.

If the image display flag is reset (S143), image display on the image display unit 28 is turned off (S144), and the flow advances to step S146. In this case, after checking sensed image data by quick review display on the image display unit 28, the function of the image display unit 28 is stopped for power saving so that the power consumption of the image display unit 28 and D/A conversion unit 26 which consume large power can be reduced.

If the shutter switch SW1 is pressed (S146), the flow returns to step S127 to cause the system control unit 50 to prepare for next image sensing.

If the shutter switch SW1 is turned off (S146), the system control unit 50 ends the series of image sensing operations, and the flow returns to step S103.

Figure 4:
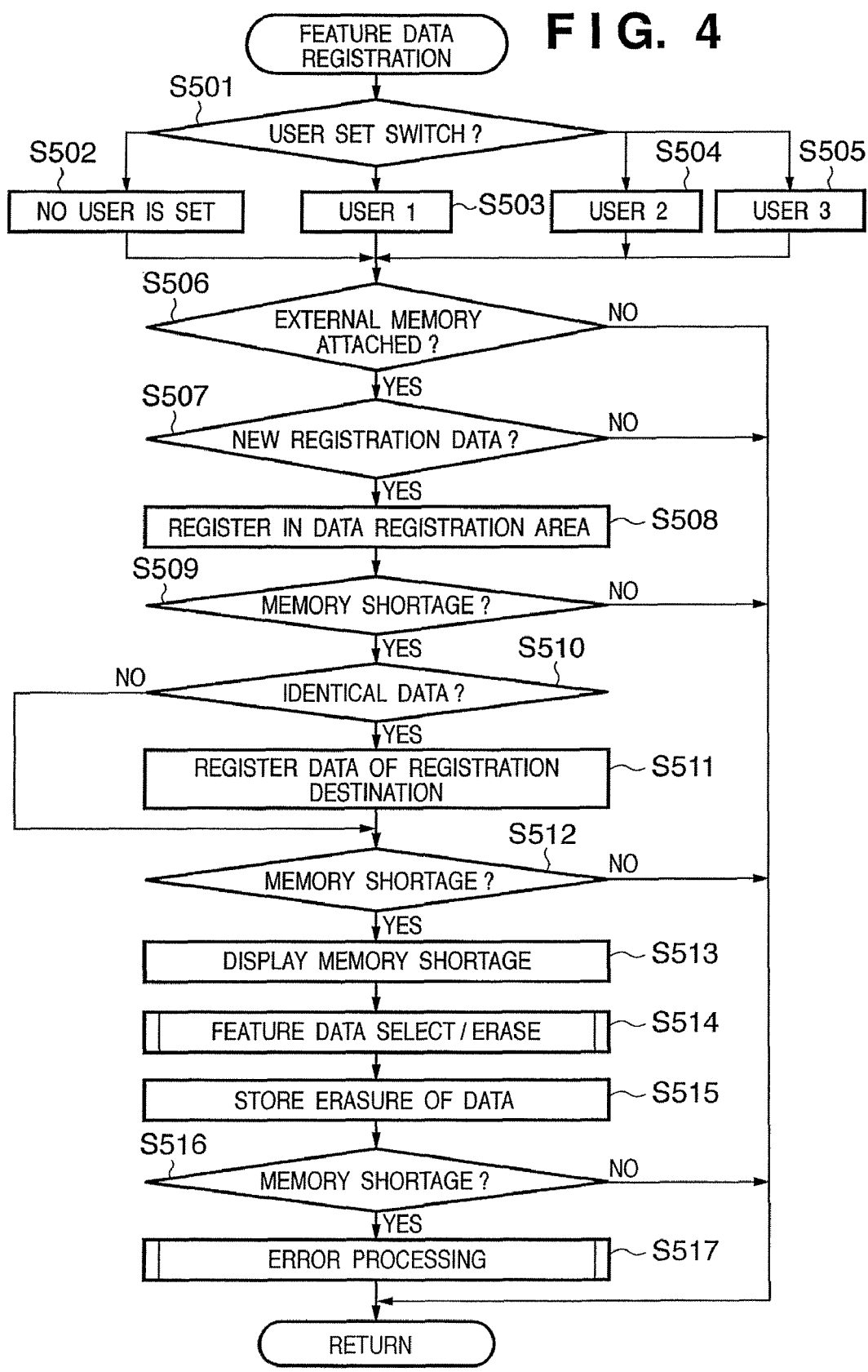
FIG. 4 is a flowchart showing feature data registration processing for object recognition in FIG. 2.
Figure 5:
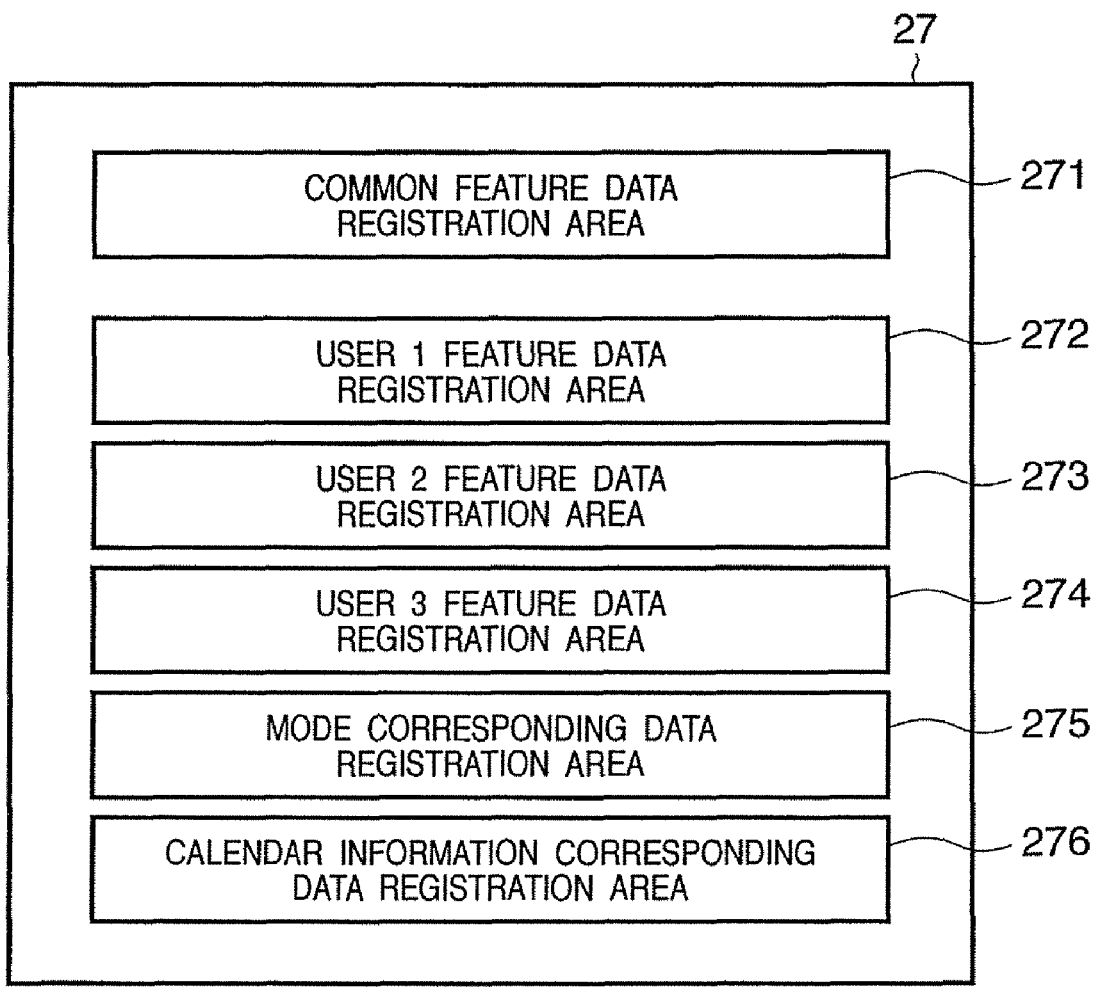
FIG. 5 is a view showing the detailed structure of feature data.

FIG. 4 is a detailed flowchart of feature data registration processing for object recognition in step S109 in FIG. 2. Feature data is personal identification data to be used for object recognition processing, including the feature data of personal feature points such as eyes, nose, mouth, eyebrow, and hair. FIG. 5 shows the detailed structure of feature data registered in the object data memory 27 shown in FIG. 1. In this embodiment, feature data will be described as personal information. However, even an animal, vehicle, or building, for instance, can also be recognized.

Referring to FIG. 5, a common feature data registration area 271 registers feature data that especially frequently become an image sensing target. For example, feature data to be used as an image sensing target by a plurality of users such as a family are registered.

A user 1 feature data registration area 272, user 2 feature data registration area 273, and user 3 feature data registration area 274 are data areas to register a plurality of data that frequently become an image sensing target for individual users.

For example, not only feature data of a plurality of persons but also detailed personal data such as sex, age, and birthday (e.g., person 1 (feature data, 20s, female, born on March 3) and person 2 (features, younger than 20, male, born on April 3)), are registered in the user feature data registration areas. The feature data of an arbitrary person or persons are registered in each user feature data registration area. The person as a recognition target is decided at the time of object recognition (to be described later) depending on the selected user feature data registration area.

For example, when the digital camera is shared by a family, the object to be sensed by the father differs from the object to be sensed by a son, as is often the case. Possible image sensing targets of the father often include colleagues and friends in the college days as well as the family. Possible image sensing targets of the son include often fellow students and club members as well as the family. If all these objects are subjected to object recognition upon each image sensing, a long time is required for recognition.

In this embodiment, the feature data of the father's colleagues and friends in the college days are registered in, e.g., the user 1 feature data registration area 272. The feature data of the son's fellow students and club members are registered in the user 2 feature data registration area 273. If setting is done such that object recognition is executed by using the user 1 feature data registration area 272 when the father uses the digital camera, unnecessary object recognition of the son's fellow students and club members can be omitted. The feature data of common objects, i.e., family are registered in the common feature data registration area 271.

In the example of this embodiment, feature data can be registered for each user. However, the present invention is not limited to this. A feature data registration area may be formed for each of registered personal groups of, e.g., a family, friends, and colleagues if the feature data of an arbitrary person can be registered for each of a plurality of groups.

A mode corresponding data registration area 275 stores link information to increase the priority of an object satisfying a specific condition in object recognition if a specific image sensing mode is selected upon image sensing. An object satisfying a specific condition is, e.g., a "woman or child" in the portrait mode.

When the portrait mode is selected, a woman or child is sensed at a high probability. Hence, link information to "increase the priority of a woman or child in the portrait mode" can be registered in the mode corresponding data registration area 275.

With this setting, object recognition is done preferentially for a woman or child in the portrait mode. In this example, the portrait mode, woman, and child are linked. However, the combination is not limited to this, and any other image sensing mode and a specific object may be linked.

The above-described priority will be described later in detail.

A calendar information corresponding data registration area 276 stores link information to increase the priority of an object satisfying a specific condition in object recognition if date information obtained from the camera indicates a specific date. An object satisfying a specific condition is an object for which a birthday matching the date information obtained from the camera is set.

When the birthday of an object matches date information, the object is sensed at a high probability. Hence, link information to "increase the priority of the object in object recognition" can be registered in the calendar information corresponding data registration area 276.

In this example, date information obtained from the camera and a birthday are linked. However, the combination is not limited to this.

Referring to FIG. 4, the system control unit 50 determines the set state of the user set switch 61 (S501) and, in accordance with the set state of the user set switch 61, registers feature data for object recognition processing of each user.

If the user set switch 61 is set to user 1 in step S501 (S503), feature data registered in the common feature data registration area 271 and user 1 feature data registration area 272 in FIG. 5 are selected as data to be used for object recognition processing. If the user set switch 61 is set to user 2 (S504), feature data registered in the common feature data registration area 271 and user 2 feature data registration area 273 in FIG. 5 are selected as data to be used for object recognition processing. Feature data registered in a plurality of user feature data registration areas may be selected as data to be used for object recognition processing. Feature data registered in user feature data registration areas that are not selected here are not used for object recognition processing.

If user 3 is set, and no data is registered in the user 3 feature data registration area 274 (S505), feature data in the common feature data registration area 271 in FIG. 5 are selected as data for object recognition. Then, the user 3 feature data registration area 274 is newly created in the object data memory 27. If the user set switch 61 is not set (S502), feature data in only the common feature data registration area 271 are selected as data to be used for object recognition processing.

The recording medium attachment detection unit 98 for detecting attachment of the recording medium 200 or 210 detects whether an external memory such as a CF® card or SD memory is attached (S506). If no external memory is attached, the flow is ended. If an external memory is attached, the system control unit 50 executes predetermined communication with the external memory to determine whether the external memory has new registration data associated with object recognition processing (S507). If no new registration data is present, the flow is ended. If new registration data is present, the data is read out through the memory control unit 22 and registered in the feature data registration area in the object data memory 27 selected in steps S503 and S504. If no user is set (S502), the data is registered in the common feature data registration area 271 (S508). If user 3 for a new user with unregistered feature data is set (S505), the data is registered in the registration area for user 3 (S508).

Next, it is checked whether the memory capacity of the registration area in step S508 is short (S509).

A memory shortage in this embodiment does not indicate a physical shortage of the memory capacity. If the remaining memory capacity is smaller than a predetermined value, the memory is regarded to be short. If the memory has no shortage, the flow is ended. If the memory has a shortage, it is determined whether data registered in currently unset registration areas and the common feature data registration area 271 and the data in the external memory include identical data (S510).

If data identical to the data in the external memory exist in a currently unset registration area, link data to the data in the data identical to the external memory is registered in a currently set registration area to save the memory space (S511). Alternatively, the data identical to the data in the external memory may be registered.

If no data identical to the data in the external memory is present in step S510, the flow advances to step S512.

It is checked whether the common feature data registration area 271 has a memory shortage (S512). If no memory shortage is present, the flow is ended. If a memory shortage occurs, the flow advances to step S513.

The memory shortage of the registration area is warned by display (S513). A feature data select/erase mode is started to select/erase feature data registrable in each registration area (S514).

Details of feature data select/erase processing in step S514 will be described later with reference to FIG. 6.

Then, it is stored in the object data memory 27 that some of the feature data in the registration area are erased (S515). It is checked whether the memory capacity of the common feature data registration area 271 has a shortage (S516). If no memory shortage is present, the flow is ended. If a memory shortage occurs, the flow advances to step S517 to execute error processing for memory overflow, and the flow is ended.

Figure 6:
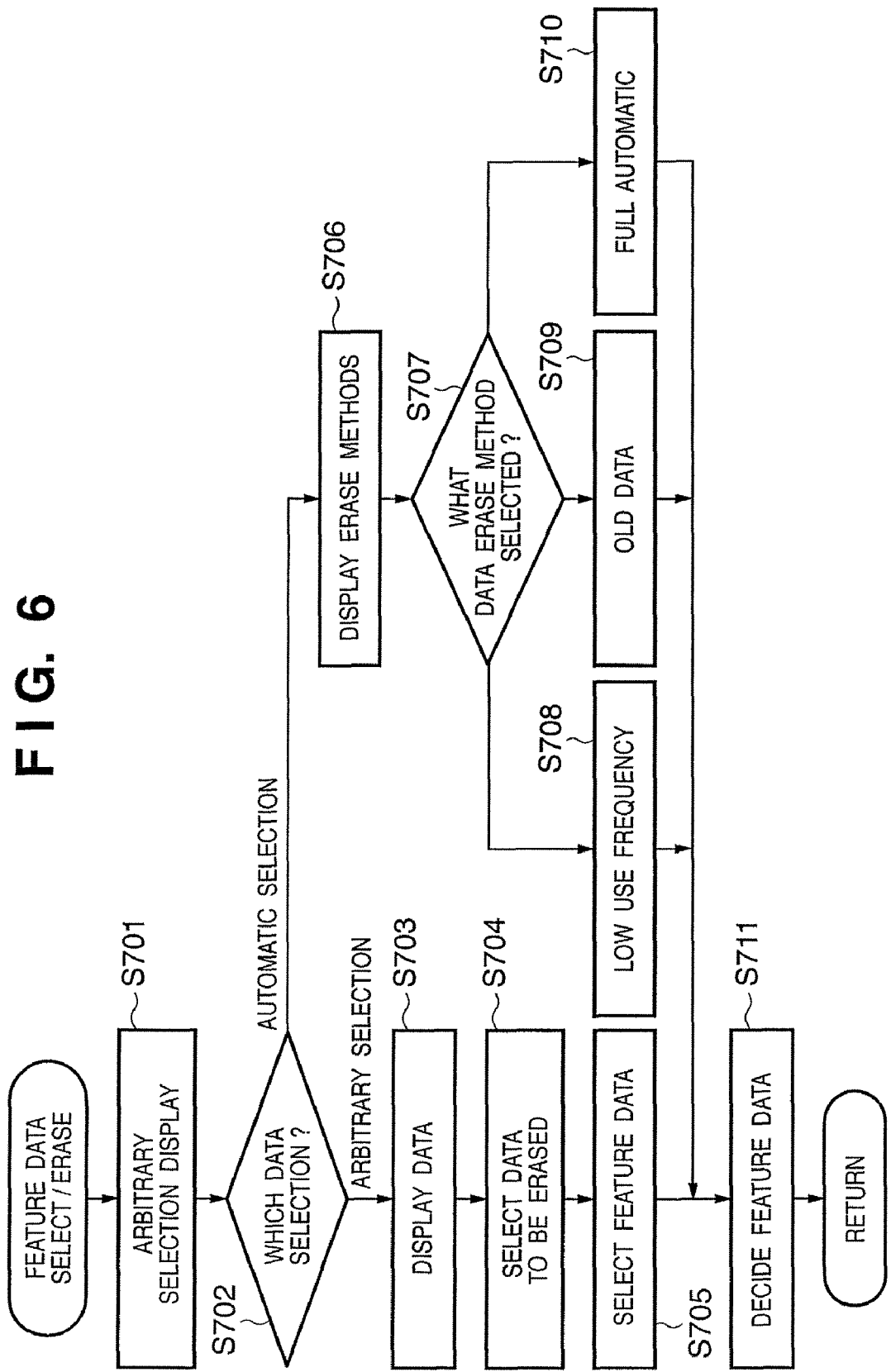
FIG. 6 is a flowchart showing select/erase processing of the feature data in FIG. 4.

FIG. 6 is a detailed flowchart of feature data select/erase processing in step S514 in FIG. 4.

The system control unit 50 executes display on the image display unit 28 to determine whether to make the user arbitrarily select feature data to be used for object recognition processing (S701). The system control unit 50 determines on the basis of the user's selection result whether to arbitrarily select feature data for object recognition processing or automatically select feature data (S702). If arbitrary selection is selected, the feature data registered in the object data memory 27 shown in FIG. 5 are displayed. More specifically, the feature data in the registration area set in step S501 in FIG. 4 and data names (file names) present in the recording medium 200 or 210 are displayed on the image display unit 28 (S703). The feature data to be erased is selected and erased (S704). With this operation, a free memory space is formed in the registration area. Data to be registered is selected from the feature data present in the recording medium 200 or 210 and written in the registration area (S705). The feature data registered in the object data memory 27 are decided (S711).

If automatic selection is selected in step S702, erase methods are displayed (S706). Erase is done on the basis of the selected erase method (S707 to S710). In the automatic erase method, of the feature data, data whose use frequency is equal to or less than a predetermined value or data with the earliest registration date/time is selected as data to be erased. For example, when the data erase method based on the use frequency is selected in step S707, feature data most frequently selected in object recognition processing is left. In this case, feature data are erased in ascending order of use frequency relative to the number of shots (S708).

When the data erase method based on the registration date/time is selected, feature data are erased in the chronological order of registration date/time (S709).

When "full automatic" is selected (S710), data are erased in consideration of the order based on the feature data use frequency and the order based on the registration date/time. For example, feature data that are registered one or more years ago and not used for three or more months are erased by the first priority. Feature data that are not used for three or more months, or feature data that are registered one or more years ago are erased by the second priority. The feature data select/erase operation is executed by the operation unit 70 shown in FIG. 1.

This embodiment suggests the three data erase methods, i.e., the method based on the use frequency, the method based on the registration date/time, and the full automatic erase method. However, the data erase methods are not limited to the above-described methods.

Figure 7:
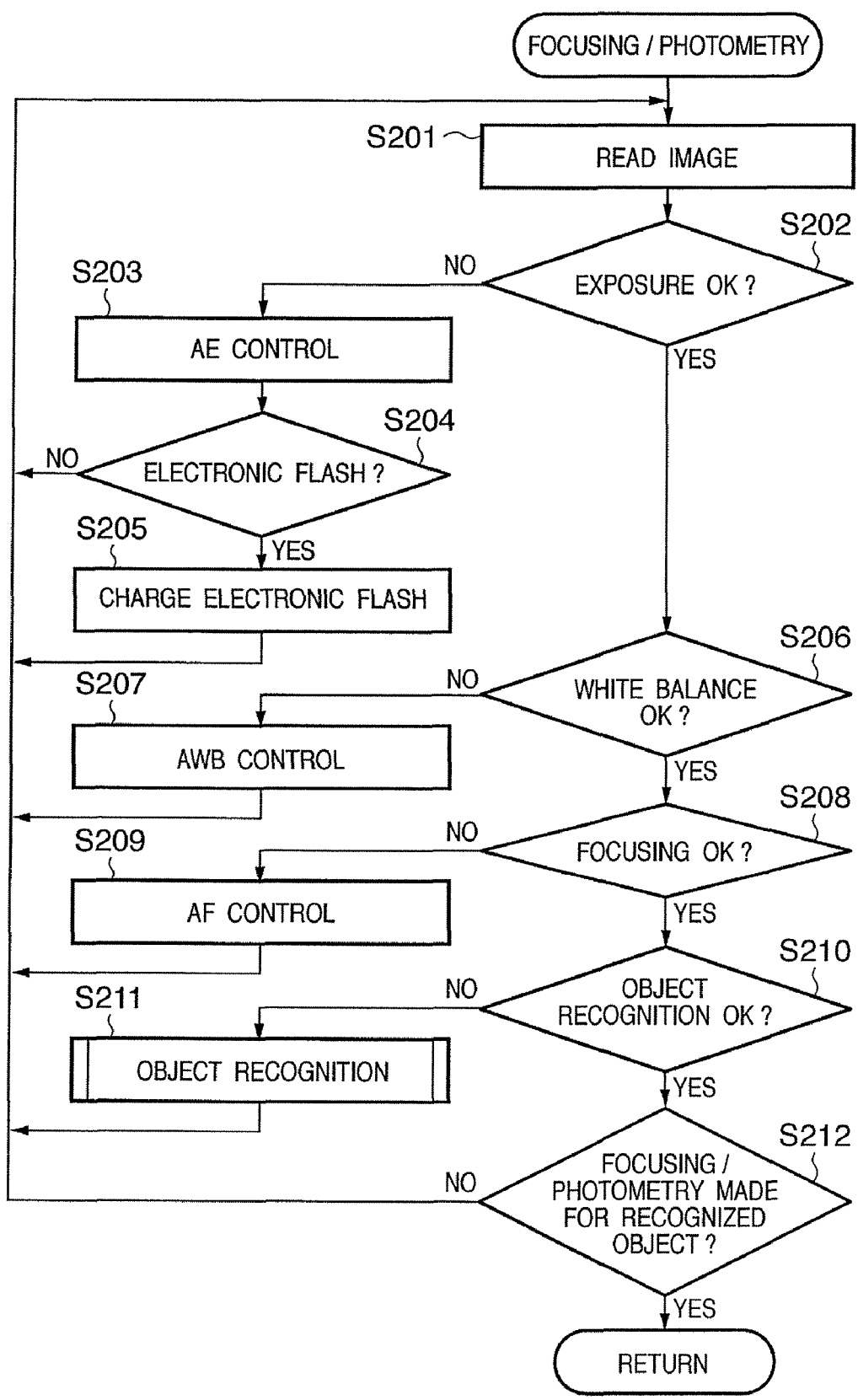
FIG. 7 is a flowchart showing focusing/photometry processing in FIG. 3.

FIG. 7 is a detailed flowchart of focusing/photometry processing in step S123 in FIG. 3.

The system control unit 50 reads out a charge signal from the image sensing element 14 and sequentially sends sensed image data to the image processing unit 20 through the A/D conversion unit 16 (S201). The image processing unit 20 executes predetermined calculations to be used for AE (Automatic Exposure) processing, EF (Electronic Flash) processing, and AF (Automatic Focus) processing of TTL (Through The Lens) scheme by using the sequentially received image data.

In each processing here, only necessary specific parts are extracted from all the sensed pixels as needed and used for calculation. Hence, in each of the AE, EF, AWB, and AF processing operations of TTL scheme, optimum calculation can be executed for each of different modes such as a center priority mode, average mode, and evaluation mode.

Using the calculation result from the image processing unit 20, the system control unit 50 executes AE control by using the exposure control unit 40 (S203) until exposure (AE) is determined to be adequate (S202).

The system control unit 50 determines using photometry data obtained by AE control whether the electronic flash is necessary (S204). If the electronic flash is necessary, a flash flag is set the electronic flash 48 is charged (S205).

If it is determined that exposure (AE) is adequate (S202), the photometry data and/or setting parameters are stored in the memory 52 or the internal memory of the system control unit 50.

Using the calculation result from the image processing unit 20 and the photometry data obtained by AE control, the system control unit 50 executes AWB control by causing the image processing unit 20 to adjust the parameters of color processing (S207) until the white balance (WB) is determined to be adequate (S206).

If it is determined that the white balance (WB) is adequate (S206), the measurement data and/or setting parameters are stored in the memory 52 or the internal memory of the system control unit 50.

Using the data obtained by AE control and AWB control, the system control unit 50 executes AF control by using the focusing control unit 42 (S209) until it is determined that an in-focus state is obtained (S208).

If it is determined that an in-focus state is obtained (S208), the focusing data and/or setting parameters are stored in the memory 52 or the internal memory of the system control unit 50. Until object recognition processing is ended (S210), the object recognition unit 25 executes object recognition (S211).

Details of object recognition processing (S211) will be described later with reference to FIG. 8.

In step S212, it is determined whether focusing and photometry are executed for the object recognized as an object (S211). If a focusing/photometry result for the recognized object is obtained, the flow is ended. If focusing/photometry is not executed for the recognized object, processing from step S201 is executed again to derive appropriate exposure, white balance, and focusing results for the recognized object, and the flow is ended.

Figure 8:
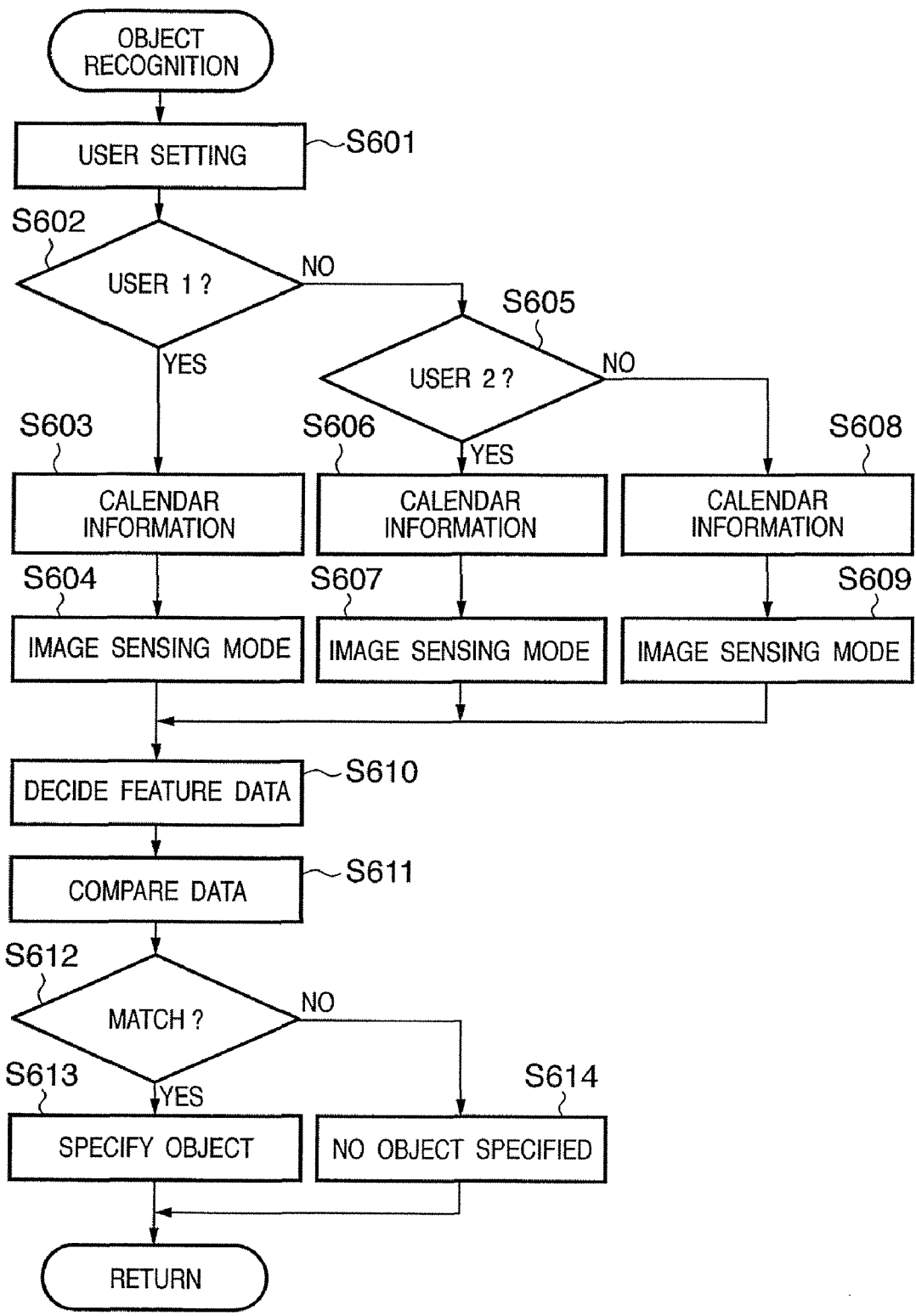
FIG. 8 is a flowchart showing object recognition processing in FIG. 7.

FIG. 8 is a detailed flowchart of object recognition processing in step S211 in FIG. 7.

In object recognition processing of the present invention, priorities are set for the reference order of object feature data stored in advance in accordance with the setting conditions of the camera in image sensing. Since recognition processing is executed by referring to object feature data sequentially in descending order of priority, object recognition can be executed efficiency, and the processing can be speeded up.

The system control unit 50 detects the state of the user set switch 61 (S601). Assume that feature data are registered in the user 1 feature data registration area 272, user 2 feature data registration area 273, and common feature data registration area 271. It is determined whether user 1 is set (S602). If user 1 is set, the user 1 feature data registration area 272 and common feature data registration area 271 shown in FIG. 5 are selected as reference data for object recognition.

On the basis of link information stored in the calendar information corresponding data registration area 276, the reference priorities of feature data as link targets in the user 1 feature data registration area 272 and common feature data registration area 271 are increased (S603).

Next, on the basis of link information stored in the mode corresponding data registration area 275, the reference priorities of feature data as link targets in the user 1 feature data registration area 272 and common feature data registration area 271 are increased (S604). The priority order of reference to feature data is decided (S610). If user 1 is not set in step S602, it is determined whether user 2 is set (S605). On the basis of link information stored in the calendar information corresponding data registration area 276, the reference priorities of feature data as link targets in the user 2 feature data registration area 273 and common feature data registration area 271 are increased (S606). Next, on the basis of link information stored in the mode corresponding data registration area 275, the reference priorities of feature data as link targets in the user 2 feature data registration area 273 and common feature data registration area 271 are increased (S607). Then the priority order of reference to feature data is decided (S610). It should be noted that it is possible to configure to make both user 1 and user 2 selectable at the same time.

If user 2 is not set, either, only the common feature data registration area 271 is selected as reference data for object recognition. On the basis of link information stored in the calendar information corresponding data registration area 276, the reference priorities of feature data as link targets in the common feature data registration area 271 are increased (S608). Next, on the basis of link information stored in the mode corresponding data registration area 275, the reference priorities of feature data as link targets in the common feature data registration area 271 are increased (S609). Then the priority order of reference to feature data is decided (S610).

Feature data extracted from the object is compared with registered feature data (S611) on the basis of the image data read in step S201 in FIG. 7 and the priority order decided in step S610. If the two data match (S612), the object in image data is specified (S613), and the flow is ended. If the two data do not match (S612), no object is specified (S614), and the flow is ended.

In step S612, the feature data are compared to determine whether they match. However, it is possible to configure so that even if the feature data themselves do not match completely, they may be regarded to match by a value within a predetermined range.

Figure 9:
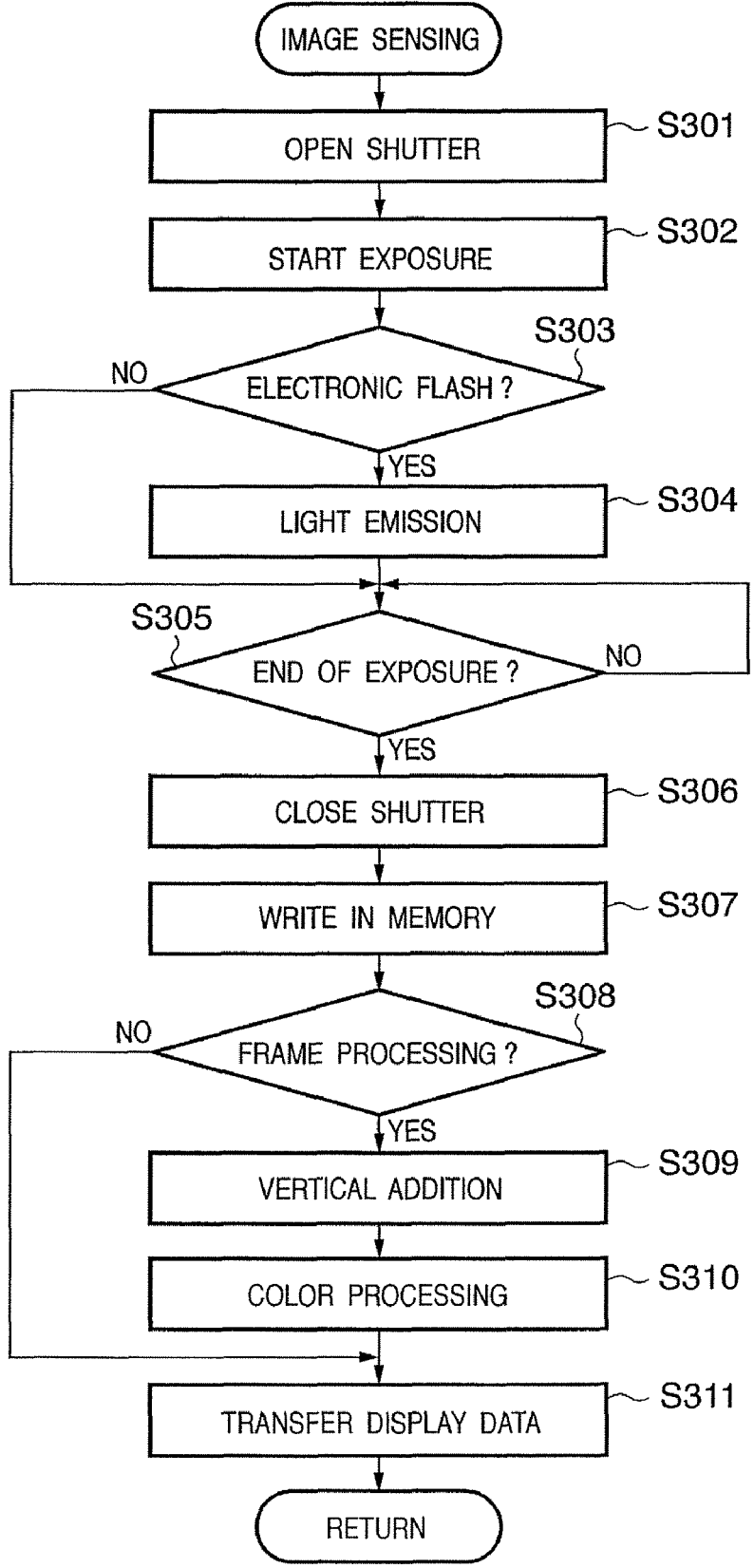
FIG. 9 is a flowchart showing image sensing processing in FIG. 3.

FIG. 9 is a detailed flowchart of image sensing processing in step S133 in FIG. 3.

In accordance with the photometry data stored in the memory 52 or the internal memory of the system control unit 50, the system control unit 50 causes the exposure control unit 40 to open the shutter 12 with a stop function in accordance with the F-number and expose the image sensing element 14 (S301 and S302).

It is determined on the basis of the flash flag whether the electronic flash 48 is necessary (S303). If necessary, the electronic flash is caused to emit light (S304).

The system control unit 50 waits until the end of exposure of the image sensing element 14 in accordance with the photometry data (S305), closes the shutter 12 (S306), and reads out a charge signal from the image sensing element 14. Sensed image data is written in the memory 30 through the A/D conversion unit 16, image processing unit 20, and memory control unit 22 or directly from the A/D conversion unit 16 through the memory control unit 22 (S307).

It is determined on the basis of the set image sensing mode whether frame processing is necessary (S308). The system control unit 50 reads out the image data from the memory 30, executes vertical addition processing (S309) and color processing (S310), and writes the processed image data in the memory 30 by using the memory control unit 22 and, as needed, the image processing unit 20.

The system control unit 50 reads out the image data from the memory 30 and transfers display data to the image display memory 24 through the memory control unit 22 (S311).

When the series of processing is ended, the flow is ended.

Figure 11:
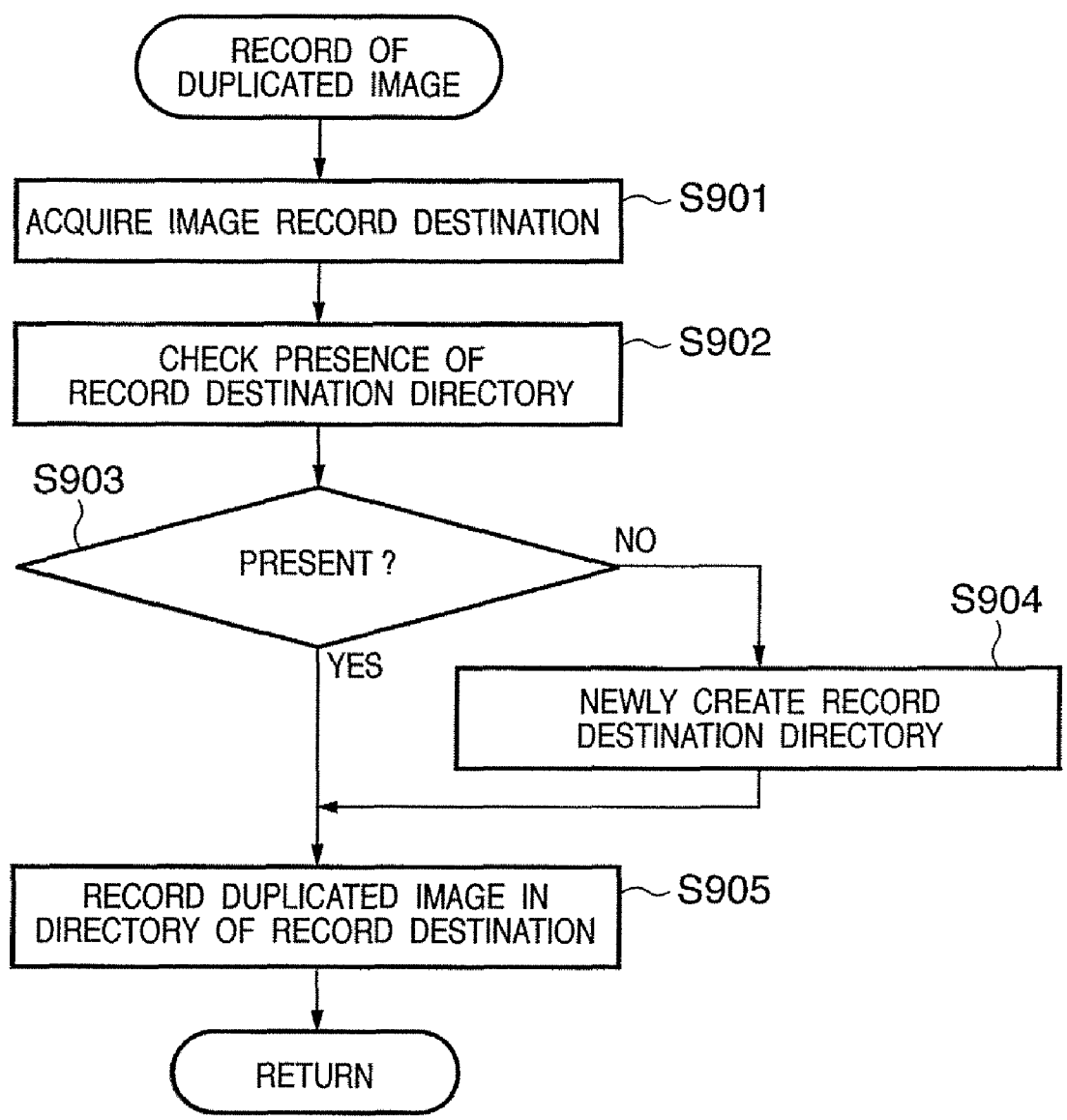
FIG. 11 is a flowchart showing details of duplicated image record processing.

FIG. 11 is a detailed flowchart of duplicated image record processing in step S804 in FIG. 10.

In step S901, the record destination of a duplicated image is acquired. The record destination management circuit 115 reads out information of a feature to be extracted, which is stored in the classification control circuit 113, and compares it with information of actually extracted features, which is input from the object recognition unit 25. In accordance with the extracted features, duplicated image data record destination information is acquired from the classification control circuit 113 and transmitted to the system control unit 50.

In step S902, the system control unit 50 checks whether a directory corresponding to the acquired record destination already exists in the recording medium 200 or 210. If a directory corresponding to the record destination exists in the recording medium 200 or 210 (YES in step S903), the flow advances to step S905. If no directory exists (NO in step S903), the flow advances to step S904 to cause the system control unit 50 to create a new directory corresponding to the record destination in the recording medium 200 or 210.

The system control unit 50 duplicates image data stored in the memory 30 and records the duplicated data in the directory corresponding to the record destination acquired in step S901 by using the memory control unit 22 (step S905). If one image data contains a plurality of features, the duplicated image data is recorded at each of the record destinations corresponding to the contained features.

When the series of processing is ended, the processing of recording the duplicated image in a directory for each feature is ended.

With this operation, duplicated images can be classified and recorded in accordance with the features contained in the images. An image containing a predetermined feature such as a desired person can be easily searched later. In addition, image data can be classified all at once into a plurality of features in accordance with the person, face expression, or scene by instructing feature extraction processing only once. Hence, image data containing a desired feature can be searched very easily.

FIG. 12 is a detailed flowchart of image record processing performed in step S139 in FIG. 3. The record processing in step S139 is not the duplicated image record processing in step S803 but original image record processing.

The system control unit 50 reads out image data from the memory 30 by using the memory control unit 22 and, as needed, the image processing unit 20 and causes the compression/decompression unit 32 to execute image compression processing corresponding to the set mode (step S1001). The compressed image data is written in the recording medium 200 or 210 such as a memory card or Compact-Flash® card through the interface 90 or 94 and connector 92 or 96 (step S1002).

When the write in the recording medium 200 or 210 is ended, the record processing is ended.

Figure 13A:
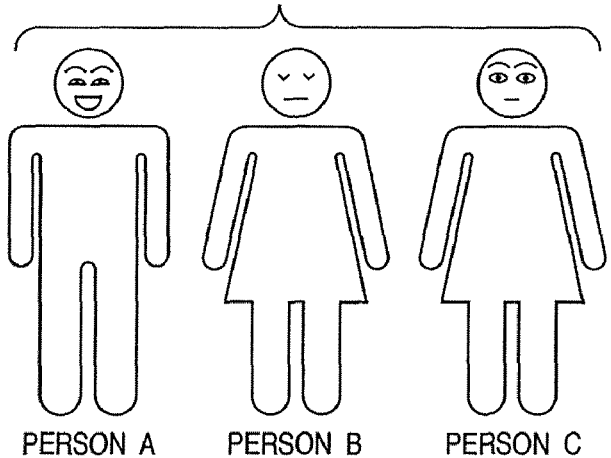
FIGS. 13A to 13E are views showing how to classify and record image data.

How to classify and record image data by duplicated image record processing in FIG. 11 and normal record processing in FIG. 12 will be described next with reference to FIGS. 13A to 13E. FIG. 13A shows three persons A, B, and C contained in an image. The person A smiles with open eyes and open mouth. The person B looks mopish with closed eyes and closed mouth. The person C has a serious expression with open eyes and closed mouth.

Figure 13B:
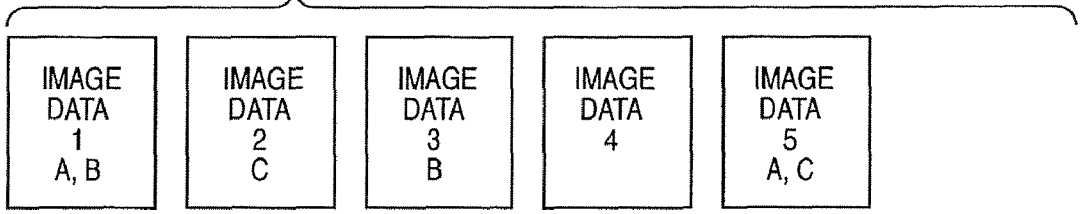

FIG. 13B shows the outline of image data 1 to 5. The image data 1 contains the persons A and B. The image data 2 contains the person C. The image data 3 contains the person B. The image data 4 contains no specific person. The image data 5 contains the persons A and C.

Figure 13C:
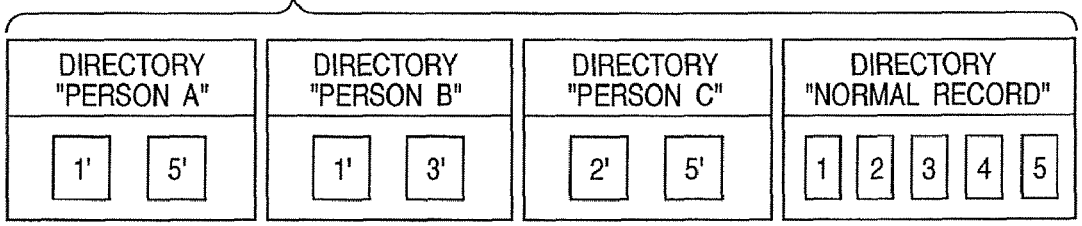

FIG. 13C shows a state wherein faces contained in the image data are extracted, and duplicated image data of each person is stored in a directory provided in the recording medium 200 or 210 for each feature. Each number in the directories indicates one of the image data 1 to 5, and "'" on a number indicates duplicated image data. As shown in FIG. 13C, duplicates of image data 1 and 5 containing the person A are recorded in "directory person A". Duplicates of image data 1 and 3 containing the person B are recorded in "directory person B". Duplicates of image data 2 and 5 containing the person C are recorded in "directory person C". The image data 4 containing no predetermined person face data is recorded in only the normal record destination directory so no duplicated image data is generated.

Figure 13D:
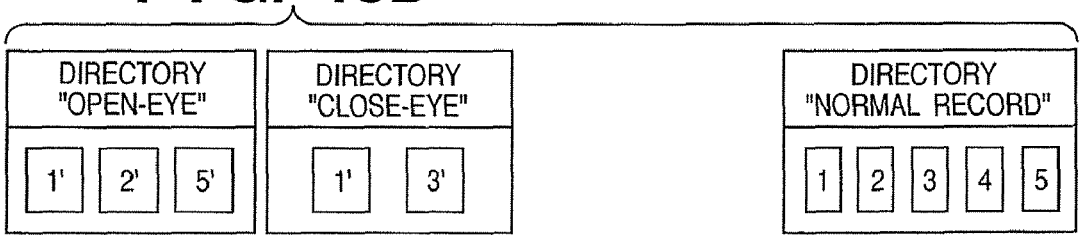

FIG. 13D shows a state wherein the state of an eye contained in image data is extracted as a feature and recorded in a directory in accordance with the open/close state of the eye. The persons A and C open the eyes. Hence, the image data 1, 2, and 5 containing the persons A and C are recorded in the normal record destination directory. In addition, duplicates of the image data 1, 2, and 5 are stored in an "open-eye" directory. The person B closes the eyes. Hence, the image data 1 and 3 containing the person B are recorded in the normal record destination directory. In addition, duplicates of the image data 1 and 3 are stored in a "close-eye" directory. The remaining image data are recorded in only the normal record destination directory.

Figure 13E:
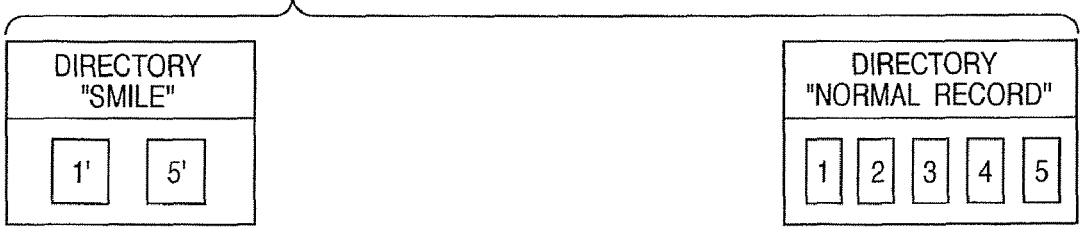

In FIG. 13E, an expression is specified from the states of the eyes and mouth contained in each extracted face. The image data 1 and 5 containing the smiling person A are extracted and recorded in the normal record destination directory. In addition, the duplicates of the image data 1 and 5 are recorded in a "smile" directory.

In the example shown in FIGS. 13A to 13E, each directory has a name representing an expression. Since the type of feature can be estimated from the directory name, convenience improves. A name may be given to each feature managed by the classification control circuit 113 so that a directory name corresponds to the feature name.

Second Embodiment

The second embodiment of the present invention will be described next.

In the above-described first embodiment, features contained in an image are recognized at the time of image record, and duplicated image data are recorded in different record destinations for each contained feature. In the second embodiment, a method of easily displaying thus classified and recorded image data independently of the number of classified and recorded image data will be described.

The arrangement of an image sensing apparatus and processing until image record according to the second embodiment are the same as those in the first embodiment described with reference to FIGS. 1 to 13E, and a description thereof will be omitted.

Figure 14:
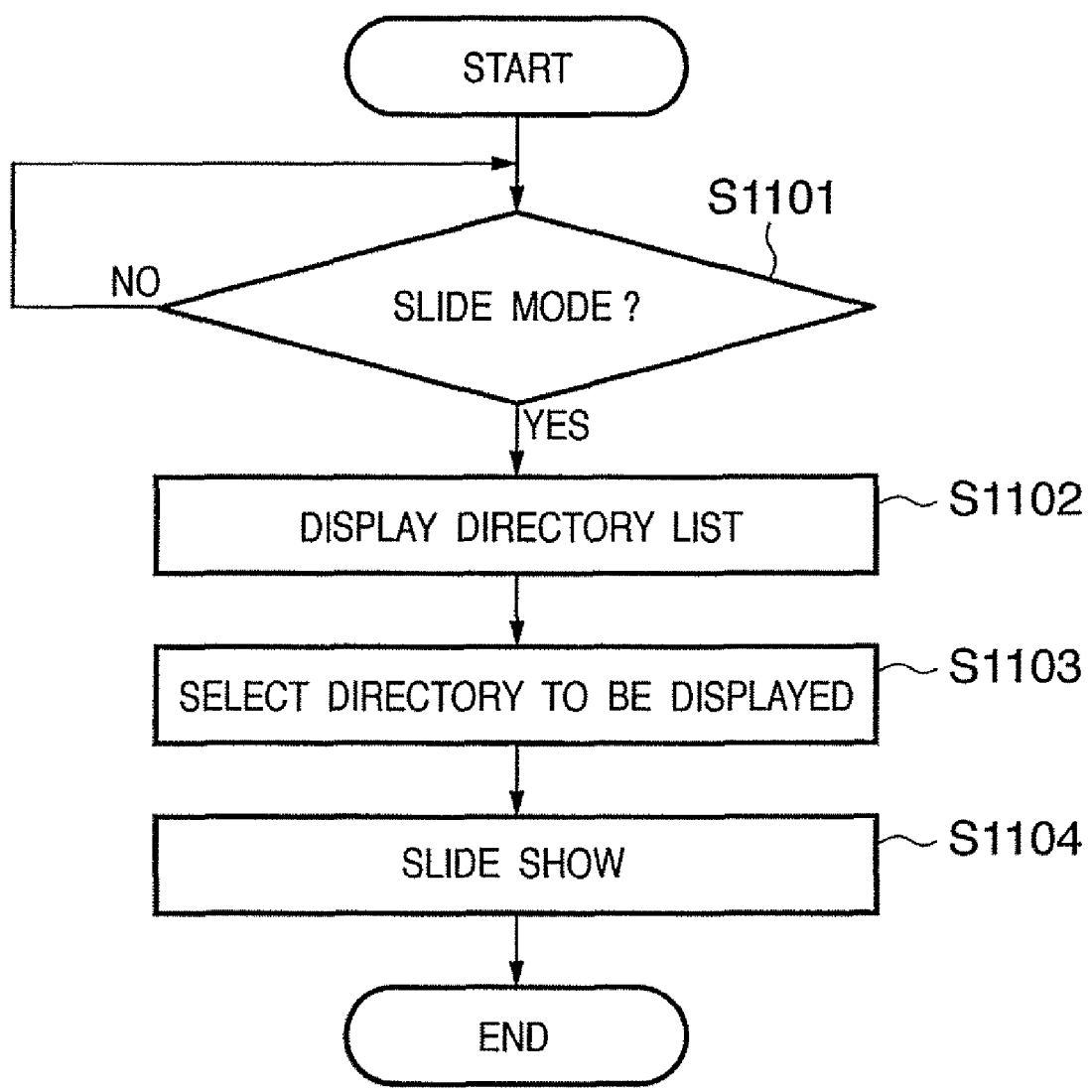
FIG. 14 is a flowchart showing a display operation according to a second embodiment.

FIG. 14 is a flowchart of a display operation according to the second embodiment.

It is determined whether a mode dial switch 60 is set to a slide mode to instruct the operation of the second embodiment (step S1101). When the slide mode is set, an image display unit 28 is powered on, and the flow advances to step S1102.

A system control unit 50 acquires information of directories provided in a recording medium 200 or 210 and classified on the basis of features. The system control unit 50 displays a list of acquired directory names through a memory control unit 22 and a D/A conversion unit 26 (step S1102).

The directory names displayed as a list can be selected through an operation unit 70. A directory to be slide-displayed is selected through the operation unit 70 (step S1103).

For the directory selected in step S1103, the system control unit 50 acquires information of image data belonging to the directory and sorts the image data on the basis of the file name or record date/time. Each image data is displayed on the image display unit 28 for a predetermined time in the sorting order (step S1104).

With this operation, the record contents of image data collected in the directories on the basis of features can easily be checked regardless of the number of image data.

In the second embodiment, image data belonging to a selected directory are displayed sequentially. However, the present invention is not limited to this. A list of image data belonging to a selected directory may be displayed. In this case, the outline and number of image data having a feature corresponding to a selected directory can easily be checked regardless of the number of image data.

When a name representing the feature of image data contained in a directory is used as the name of the directory, the user can more easily select a directory containing image data having a desired feature.

Third Embodiment

The third embodiment of the present invention will be described next.

In the above-described first embodiment, features contained in an image are recognized at the time of image record, and duplicated image data are recorded in different record destinations for each contained feature. In the third embodiment, a method of easily printing thus recorded image data independently of the number of image data will be described.

Figure 16:
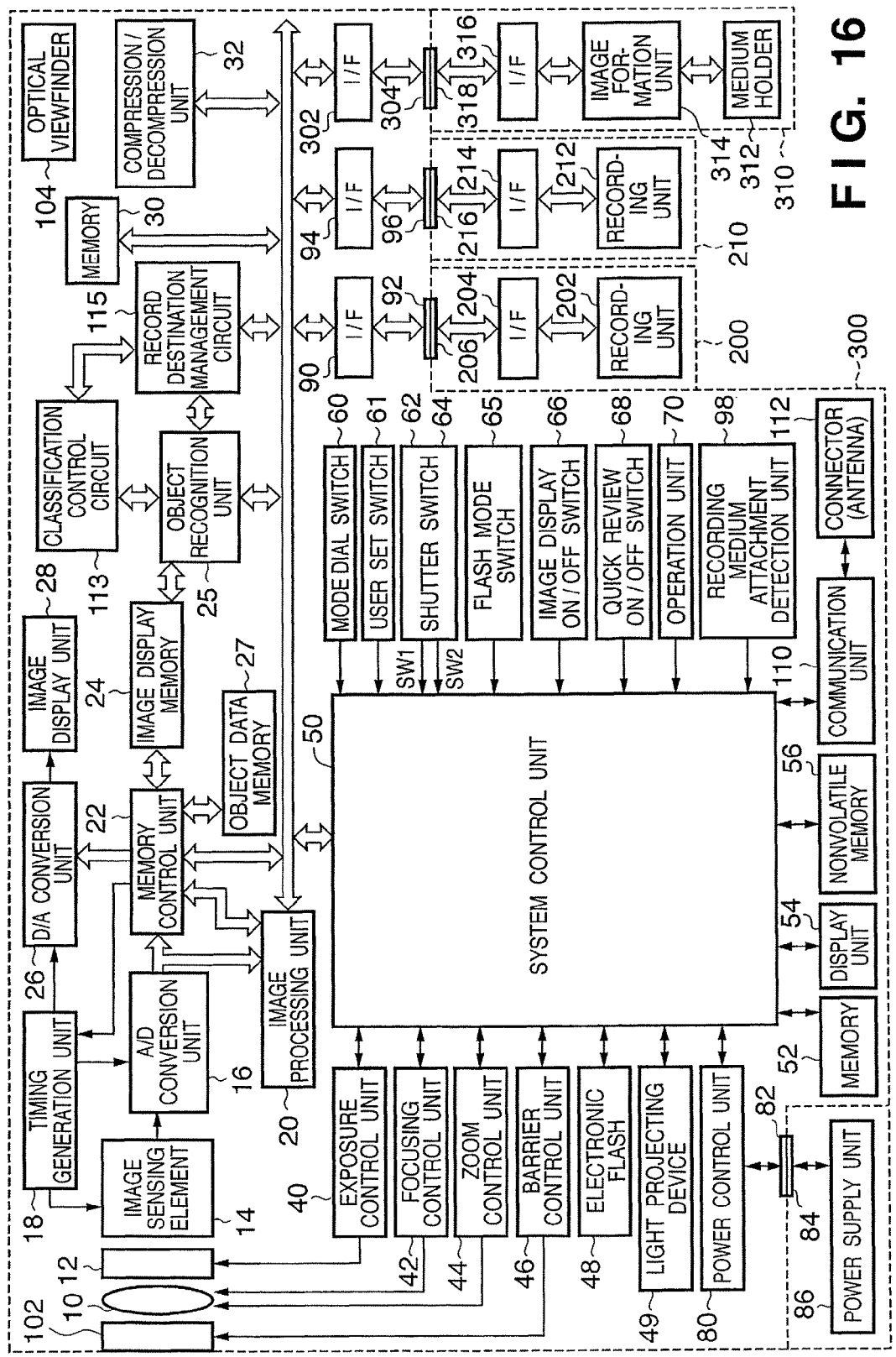
FIG. 16 is a block diagram showing a configuration of an image sensing apparatus according to the third embodiment.

FIG. 16 is a block diagram showing the configuration of an image sensing apparatus 300 according to the third embodiment of the present invention. FIG. 16 is different from FIG. 1 in that the image sensing apparatus 300 has an image formation unit. The remaining components are the same as those of the image processing apparatus 100 shown in FIG. 1 and are indicated by the same reference numerals as in FIG. 1, and a description thereof will be omitted. Processing until image record in the image sensing apparatus shown in FIG. 16 is the same as in the first embodiment described with reference to FIGS. 2 to 13E, and a description thereof will be omitted.

Referring to FIG. 16, reference numeral 302 denotes an interface to a printing mechanism 310 (to be described later); 304, a connector connected to the printing mechanism 310; and 306, a printing mechanism attachment detection circuit which detects whether the printing mechanism 310 is attached to the connector 304.

The printing mechanism 310 prints and outputs image data. The printing mechanism 310 comprises a medium holder 312 that stores a printing medium and appropriately supplies it to an image formation unit 314 (to be described later), the image formation unit 314 that forms an image on the printing medium, an interface 316 to the image sensing apparatus 300, and a connector 318 connected to the image sensing apparatus 300.

Figure 15:
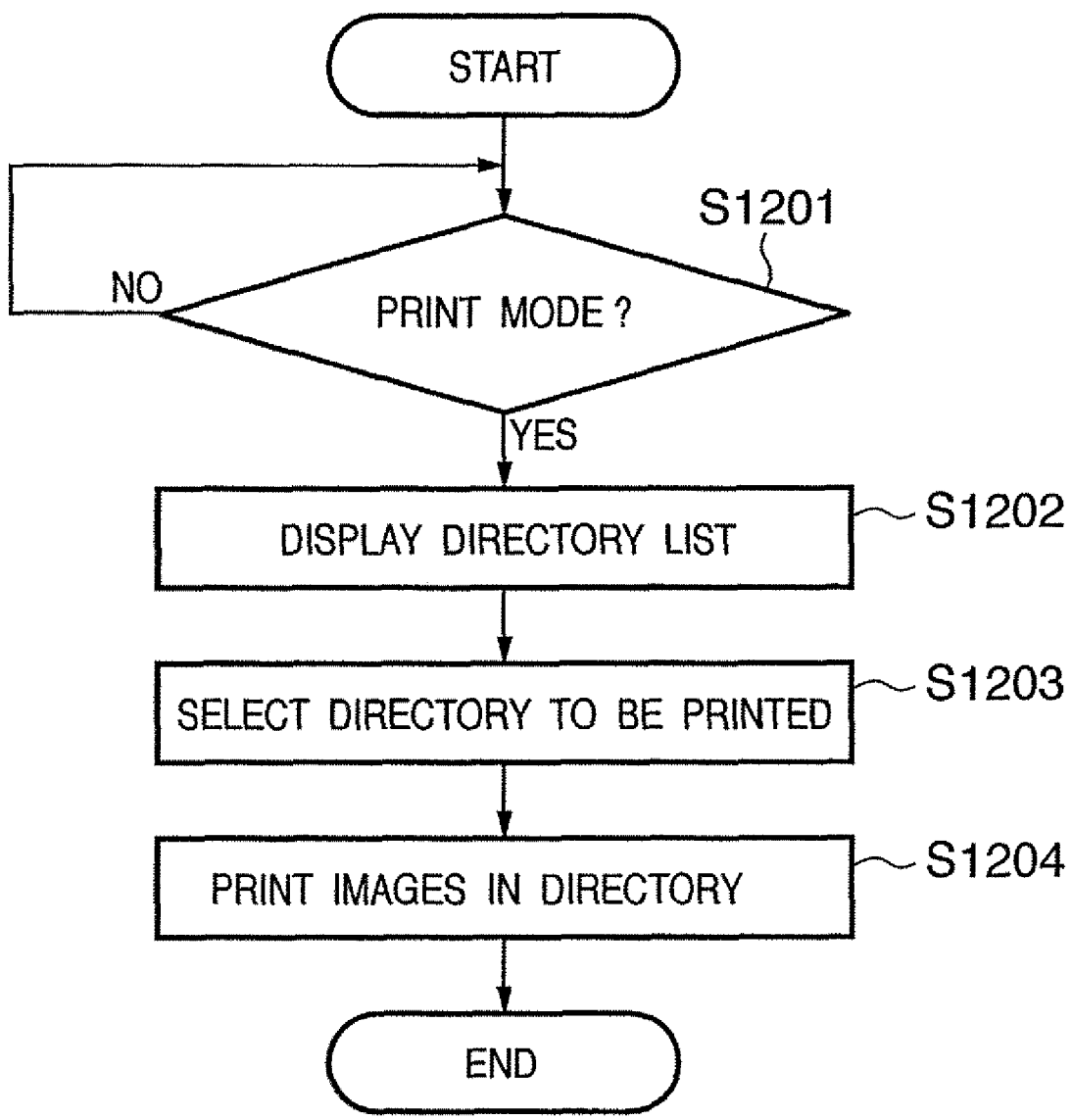
FIG. 15 is a flowchart showing a print operation according to a third embodiment.

FIG. 15 is a flowchart showing a print operation according to the third embodiment.

It is determined whether a mode dial switch 60 is set to a print mode to instruct the operation of the third embodiment (step S1201). When the print mode is set, an image display unit 28 is powered on, and the flow advances to step S1202.

A system control unit 50 acquires information of directories provided in a recording medium 200 or 210 and classified on the basis of features. The system control unit 50 displays a list of acquired directory names through a memory control unit 22 and a D/A conversion unit 26 (step S1202).

The directory names displayed as a list can be selected through an operation unit 70. A directory to be printed is selected through the operation unit 70 (step S1203).

For the directory selected in step S1203, the system control unit 50 acquires information of image data belonging to the directory and sorts the image data on the basis of the file name or record date/time. The system control unit 50 reads out the image data from the recording medium 200 or 210 in the sorting order and transmits the image data to the image formation unit 314. The image formation unit 314 receives a printing medium such as photographic paper from the medium holder 312 as the image data is input and forms an image on the printing medium (step S1204).

With this operation, image data collected in the directories on the basis of features can easily be printed and output regardless of the number of image data.

In the third embodiment, print output is done by using the printing mechanism belonging to the image sensing apparatus 300. However, the present invention is not limited to this. Image data in a directory may be transmitted to an external printing device through a communication unit 110 so that the external printing device can print and output the image data.

When a name representing the feature of image data contained in a directory is used as the directory name, the user can more easily select a directory containing image data having a desired feature.

In the above-described second and third embodiments, the display operation and print operation in the image sensing apparatus have been described. However, the present invention is not limited to the image sensing apparatus. For example, the operations can also be executed by an image processing apparatus such as a PC having no image sensing element 14 by using image data classified and recorded in the recording medium 200 or 210 for each feature. Image data is not limited to an image obtained by the image sensing element 14. Image data made by, e.g., CG may also be used.

Other Embodiment

The embodiments of the present invention have been described above in detail by using detailed examples. The present invention can take a form of, e.g., a system, apparatus, method, program, or storage medium (recording medium).

More specifically, the present invention can be applied to a system including a plurality of devices or an apparatus including a single device.

The object of the present invention is achieved when any parts of the illustrated functional blocks and operations are implemented by a hardware circuit or software processing using a computer.

The present invention is also achieved even by supplying a software program which implements the functions of the above-described embodiments to the system or apparatus directly or from a remote site. In this case, the computer of the system or the like reads out and executes the program codes.

Hence, the program code itself, which is installed in the computer to implement the functional processing of the present invention by the computer, also implements the present invention. That is, the computer program itself to implement the functional processing of the present invention is also incorporated in the present invention.

In this case, the program can take any form such as an object code, a program to be executed by an interpreter, or script data to be supplied to the OS as long as the functions of the program can be obtained.

As a recording medium (storage medium) to supply the program, for example, a flexible disk, hard disk, optical disk, and magnetooptical disk can be used. In addition, an MO, CD-ROM, CD-R, CD-RW, magnetic tape, nonvolatile memory card, ROM, and DVD (DVD-ROM and DVD-R) can be used.

As another program supply method, a client computer may be connected to a homepage on the Internet by using a browser in the client computer, and the computer program itself of the present invention may be downloaded from the homepage. Alternatively, a compressed file containing an automatic install function may be downloaded to a recording medium such as a hard disk. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program by using the key information, and install the program in the computer.

The functions of the above-described embodiments are implemented not only when the readout program is executed by the computer but also when, e.g., the OS running on the computer performs part or all of actual processing on the basis of the instructions of the program.

The functions of the above-described embodiments are also implemented when the program read out from the recording medium is written in the memory of a function expansion board inserted into the computer or a function expansion unit connected to the computer, and the CPU of the board or the like performs part or all of actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-217393 filed on Jul. 27, 2005, and Japanese Patent Application No. 2005-224596 filed on Aug. 2, 2005, which are hereby incorporated by reference herein in their entirety.

What is claimed is:

1. An image processing apparatus comprising:
a data memory configured to register a set of feature data for each person of a plurality of persons, and to classify the feature data in all the registered sets into a plurality of subsets such that each subset includes a part of the feature data;
an extraction unit configured to extract feature data from image data of a person in an obtained image;
a selection unit configured to select a subset from the plurality of subsets; and
an object recognition unit configured to recognize the person in the obtained image by comparing the feature data included in the subset selected by the selection unit with the feature data extracted by the extraction unit,
wherein the object recognition unit gives an order of priority to the feature data of the subset selected by the selection unit, and compares the feature data extracted by the extraction unit with the feature data of the subset selected by the selection unit in the order of priority based on an image sensing mode.

2. The apparatus according to claim 1, wherein each set of feature data is associated with a specific user of the image processing apparatus.

3. The apparatus according to claim 1, wherein the feature data belonging to a subset that is not selected by the selection unit is not used for comparison in recognizing the person in the obtained image.

4. The apparatus according to claim 1, wherein the data memory further registers feature data to be used for comparison in recognizing a person separately from the feature data included in the subset selected by the selection unit.

5. The apparatus according to claim 1, wherein the object recognition unit gives an order of priority to the feature data of the subset selected by the selection unit, and compares the feature data extracted by the extraction unit with the feature data selected by the selection unit in the order of priority based on an image sensing date or time.

6. The apparatus according to claim 1, wherein the set of feature data is generated in advance and is obtained from an external storage medium.

7. An image processing method of an image processing apparatus, the image processing method comprising:
registering a set of feature data for each person of a plurality of persons in a data memory;
classifying the feature data in all registered sets into a plurality of subsets such that each subset includes a part of the feature data;
selecting a subset from the plurality of subsets;
extracting feature data from image data of a person in an obtained image; and
recognizing the person in the obtained image by comparing the feature data included in the selected subset with the extracted feature data,
wherein recognizing the person in the obtained image includes giving an order of priority to the feature data of the selected subset and comparing the extracted feature data with the feature data of the selected subset in the order of priority based on an image sensing mode.

8. A non-transitory computer-readable storage medium that stores a program which causes a computer to execute an image processing method, the image processing method comprising:
- registering a set of feature data for each person of a plurality of persons in a data memory;
- classifying the feature data in all registered sets into a plurality of subsets such that each subset includes a part of the feature data;
- selecting a subset from the plurality of subsets;
- extracting feature data from image data of a person in an obtained image; and
- recognizing the person in the obtained image by comparing the feature data included in the selected subset with the extracted feature data, wherein recognizing the person in the obtained image includes giving an order of priority to the feature data of the selected subset and comparing the extracted feature data with the feature data of the selected subset in the order of priority based on an image sensing mode.

* * * * *